(12) United States Patent
Hamner et al.

(10) Patent No.: US 11,644,299 B2
(45) Date of Patent: May 9, 2023

(54) INDUCTIVE POSITION SENSOR SIGNAL GAIN CONTROL FOR COORDINATE MEASURING MACHINE PROBE

(71) Applicant: Mitutoyo Corporation, Kanagawa-ken (JP)

(72) Inventors: Christopher Richard Hamner, Kirkland, WA (US); Scott Allen Harsila, Shoreline, WA (US); Scott Ellis Hemmings, Edmonds, WA (US); Andrew Michael Patzwald, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 338 days.

(21) Appl. No.: 17/139,592

(22) Filed: Dec. 31, 2020

(65) Prior Publication Data

US 2022/0205773 A1    Jun. 30, 2022

(51) Int. Cl.
*G01B 7/012* (2006.01)
*G01D 5/20* (2006.01)

(52) U.S. Cl.
CPC ........... *G01B 7/012* (2013.01); *G01D 5/2053* (2013.01)

(58) Field of Classification Search
CPC .............................. G01B 7/012; G01D 5/2053
USPC ......................................................... 33/559
See application file for complete search history.

(56) References Cited

U.S. PATENT DOCUMENTS

| | | | |
|---|---|---|---|
| 4,810,966 A | 3/1989 | Schmall | |
| 4,866,854 A | 9/1989 | Seltzer | |
| 5,041,806 A * | 8/1991 | Enderle | B23Q 3/1546 33/561 |
| 5,109,223 A | 4/1992 | Schmitt et al. | |
| 5,209,131 A | 5/1993 | Baxter | |
| 5,299,361 A * | 4/1994 | Fiedler | G01B 5/012 33/561 |
| 5,326,982 A | 7/1994 | Wiklund | |
| 5,345,689 A | 9/1994 | McMurtry et al. | |

(Continued)

OTHER PUBLICATIONS

Hamner, "Inductive Position Detection Configuration for Indicating a Measurement Device Stylus Position," U.S. Appl. No. 17/135,665, filed Dec. 28, 2020, 119 pages.

(Continued)

*Primary Examiner* — George B Bennett
(74) *Attorney, Agent, or Firm* — Seed IP Law Group LLP

(57) ABSTRACT

A scanning probe for a coordinate measuring machine with inductive position sensor signal gain control is provided. The scanning probe includes a stylus position detection portion with field generating and sensing coils, and for which corresponding output signals are indicative of a position of the probe tip of the stylus. Signal processing and control circuitry is configured to implement different operating regions, such as a central high gain operating region which corresponds to a central probe tip position range, as well as other lower gain operating regions, and for which transition operations may be performed for adjusting the gain. In various implementations, transition operations for adjusting a gain may include operations such as: adjusting power to a field generating coil configuration; adjusting a gain of a front end amplifier; altering characteristics of sensing coils; adjusting an input range of an analog to digital converter; etc.

23 Claims, 14 Drawing Sheets

(56) References Cited

U.S. PATENT DOCUMENTS

| | | | |
|---|---|---|---|
| 5,841,274 A | 11/1998 | Masreliez et al. | |
| 5,887,356 A * | 3/1999 | Sheldon | G01B 7/012 33/559 |
| 6,043,644 A | 3/2000 | de Coulon et al. | |
| 6,526,672 B1 | 3/2003 | Danielli et al. | |
| 6,760,977 B2 * | 7/2004 | Jordil | G01B 5/012 33/561 |
| 6,971,183 B2 | 12/2005 | Brenner et al. | |
| 7,652,275 B2 | 1/2010 | Gladnick | |
| 7,792,654 B2 * | 9/2010 | Prestidge | G01B 7/012 702/95 |
| 8,438,746 B2 | 5/2013 | Usui | |
| 8,676,533 B2 * | 3/2014 | Wooldridge | G01B 5/012 702/141 |
| RE45,211 E | 10/2014 | McFarland et al. | |
| 9,791,262 B2 | 10/2017 | Harsila et al. | |
| 9,803,972 B2 | 10/2017 | Sesko | |
| 9,835,433 B1 | 12/2017 | Antreasyan et al. | |
| 9,970,744 B2 | 5/2018 | Hemmings et al. | |
| 10,006,757 B1 | 6/2018 | Sesko | |
| 10,145,666 B2 | 12/2018 | Jansson | |
| 10,184,773 B2 | 1/2019 | Jansson | |
| 10,215,547 B2 | 2/2019 | Hemmings et al. | |
| 10,323,928 B2 | 6/2019 | Sesko | |
| 10,415,949 B2 * | 9/2019 | Koga | G01B 7/001 |
| 10,837,848 B2 * | 11/2020 | Janisch | G01D 5/2053 |
| 10,866,080 B2 | 12/2020 | Cook et al. | |
| 11,047,678 B2 * | 6/2021 | Koga | G01B 21/04 |
| 11,525,701 B2 * | 12/2022 | Lugani | G01D 5/204 |
| 11,543,899 B2 * | 1/2023 | Hamner | G01B 7/012 |
| 2003/0048592 A1 | 3/2003 | Thomas et al. | |
| 2005/0253576 A1 | 11/2005 | Nyce | |
| 2013/0111774 A1 | 5/2013 | McMurtry et al. | |
| 2015/0330766 A1 | 11/2015 | Gong | |
| 2016/0195389 A1 | 7/2016 | Sagemueller et al. | |
| 2017/0176171 A1 | 6/2017 | Harsila et al. | |
| 2017/0370688 A1 | 12/2017 | Hemmings et al. | |
| 2018/0156594 A1 | 6/2018 | Jansson | |
| 2018/0364026 A1 | 12/2018 | Sesko | |
| 2019/0004092 A1 | 1/2019 | Hemmings | |
| 2019/0120606 A1 | 4/2019 | Harsila et al. | |
| 2020/0049498 A1 | 2/2020 | Rees et al. | |
| 2020/0141714 A1 | 5/2020 | Cook et al. | |
| 2020/0141717 A1 | 5/2020 | Hamner et al. | |

OTHER PUBLICATIONS

Hamner, "Inductive Position Detection Configuration for Indicating a Measurement Device Stylus Position and Including Coil Misalignment Compensation," U.S. Appl. No. 17/135,672, filed Dec. 28, 2020, 119 pages.

Extended European Search Report dated May 23, 2022, for corresponding EP Application No. 21216860.3-1001, 5 pages.

* cited by examiner

INDUCTIVE POSITION SENSOR SIGNAL GAIN CONTROL FOR COORDINATE MEASURING MACHINE PROBE

BACKGROUND

Technical Field

This disclosure relates to precision metrology, and more particularly to coordinate measuring machine probes utilizing inductive type sensing configurations.

Description of the Related Art

Coordinate measurement machines (CMM's) can obtain measurements of inspected workpieces. One exemplary prior art CMM described in U.S. Pat. No. 8,438,746, which is hereby incorporated herein by reference in its entirety, includes a probe for measuring a workpiece, a movement mechanism for moving the probe, and a controller for controlling the movement. A CMM including a surface scanning probe is described in U.S. Pat. No. 7,652,275, which is hereby incorporated herein by reference in its entirety. As disclosed therein, a mechanical contact probe or an optical probe may scan across the workpiece surface.

A CMM employing a mechanical contact probe is also described in U.S. Pat. No. 6,971,183, which is hereby incorporated herein by reference in its entirety. The probe disclosed therein includes a stylus having a probe tip (i.e., a surface contact portion), an axial motion mechanism, and a rotary motion mechanism. The axial motion mechanism includes a moving member that allows the probe tip to move in a central axis direction (also referred to as a Z direction or an axial direction) of the measuring probe. The rotary motion mechanism includes a rotating member that allows the probe tip to move perpendicular to the Z direction. The axial motion mechanism is nested inside the rotary motion mechanism. The probe tip location and/or workpiece surface coordinates are determined based on the displacement of the rotating member and the axial displacement of the axial motion moving member.

Inductive position detectors for stylus position measurements in CMM scanning probes are disclosed in U.S. Patent Publication Nos. 2020/0141714 and 2020/0141717, each of which is hereby incorporated herein by reference in its entirety. The disclosed configurations include rotary sensing coils and respective axial sensing coil configurations. A stylus-coupled conductive disruptor moves along Z (axial) and X-Y (rotary) directions in a motion volume. A generating coil generates a changing magnetic flux encompassing the disruptor and coils, and coil signals indicate the disruptor and/or stylus position.

In general, inductive sensing configurations in CMM probes may encounter various issues, such as signal/response non-linearities that are inherent in the displacement response of the system, position offsets and/or errors resulting from less than perfect assembly and alignment, signal drift due to environmental effects on mechanical and electrical components (e.g., due to temperature changes, etc.), signal noise, etc. Such issues may present particular challenges in such systems in which it is typically desirable to sense the smallest possible deflections of a probe tip from the smallest possible signal variations. These types of issues may present various challenges for achieving a desired range, amplification, signal-to-noise ratio, etc., for position signals from the probe. A need exists for improved circuitry configurations and processing that can address such issues in CMM probes utilizing inductive type sensing configurations.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A scanning probe for a coordinate measuring machine with inductive position sensor signal gain control is provided. The scanning probe includes a stylus suspension portion, a stylus position detection portion, and signal processing and control circuitry. The stylus suspension portion is coupled to a frame of the scanning probe and includes a stylus coupling portion and a stylus motion mechanism. The stylus coupling portion is configured to be rigidly coupled to a stylus with a probe tip. The stylus motion mechanism is configured to enable axial motion of the stylus coupling portion along an axial direction, and rotary motion of the stylus coupling portion about a rotation center.

The stylus position detection portion is arranged along a central axis that is parallel to the axial direction and nominally aligned with the rotation center, and includes: a field generating coil configuration comprising at least one field generating coil; a top axial sensing coil configuration comprising at least one top axial sensing coil; a bottom axial sensing coil configuration comprising at least one bottom axial sensing coil; N top rotary sensing coils and N bottom rotary sensing coils, where N is an integer greater than 3; and a disruptor configuration. The disruptor configuration includes a conductive disruptor element that provides a disruptor area. The disruptor element is located along the central axis in a disruptor motion volume and the disruptor element is coupled to the stylus suspension portion by a coupling configuration. The disruptor element moves in the disruptor motion volume relative to an undeflected position in response to a deflection of the stylus suspension portion. The disruptor element moves over operating motion ranges +/−Rz along the axial direction in response to the axial motion, and over respective operating motion ranges +/−Rx and +/−Ry along orthogonal X and Y directions that are orthogonal to the axial direction in response to the rotary motion. The field generating coil configuration generates a changing magnetic flux generally along the axial direction in the disruptor motion volume in response to a coil drive signal.

The signal processing and control circuitry is operably connected to the coils of the stylus position detection portion to provide the coil drive signal and is configured to input signals comprising respective signal components provided by the respective rotary and axial sensing coils, and output signals indicative of an axial position and a rotary position of the probe tip, and for which an output signal change correspondingly indicates a change in at least one of an axial or rotary position of the probe tip. The signal processing and control circuitry is configured to operate over a plurality of operating regions, such as including a central high gain operating region which corresponds to a central high gain probe tip position range, and a first pair of lower gain operating regions which corresponds to respective lower gain probe tip position ranges, for which the central high gain operating region is between the operating regions of the first pair of lower gain operating regions. In various implementations, the gain of each operating region corresponds to a ratio of a magnitude of output signal change to probe tip position change for the respective operating region (e.g., for which the first pair of lower gain operating regions has lower respective gains than the gain of the central high gain operating region).

In various implementations, the signal processing and control circuitry is configured to perform a transition operation in response to a determination that the probe tip has moved from a position in the central high gain probe tip position range of the central high gain operating region to a position in a lower gain probe tip position range of a respective operating region of the first pair of lower gain operating regions. The transition operation results in the signal processing and control circuitry transitioning from operating in the central high gain operating region with the high gain to operating in the respective operating region with the lower gain.

In various implementations, the plurality of operating regions may further include a second pair of lower gain operating regions which corresponds to respective lower gain probe tip position ranges, and for which the operating regions of the first pair of lower gain operating regions may be between the operating regions of the second pair of lower gain operating regions, and for which the second pair of lower gain operating regions has lower respective gains than the gains of the first pair of lower gain operating regions. The signal processing and control circuitry may correspondingly be further configured to perform a transition operation in response to a determination that the probe tip has moved to a position in a lower gain probe tip position range of a respective operating region of the second pair of lower gain operating regions, the transition operation resulting in the signal processing and control circuitry transitioning to operating in the respective operating region of the second pair of lower gain operating regions with the lower gain.

In various implementations, the plurality of operating regions may further include a pair of saturation operating regions which corresponds to respective saturation probe tip position ranges, wherein the second pair of lower gain operating regions is between the pair of saturation operating regions, and the pair of saturation operating regions corresponds to a saturation state in which nominally no output signal change results from probe tip position change and for which there is nominally no corresponding gain. In various implementations, the signal processing and control circuitry may include one or more amplifiers configured to amplify signals from coils of the stylus position detection portion, and for which the saturation state corresponds to a saturation of at least one of the one or more amplifiers.

In various implementations, the central high gain operating region which corresponds to the central high gain probe tip position range also corresponds to a central high gain element position range, which corresponds to an angular position range of the disruptor element, and which is configured to be utilized in combination with a stylus of a first stylus length. In such a configuration, for a stylus of a second stylus length, the central high gain element position range may be configured to be modified to be at least one of: shorter, as configured to be utilized with a second stylus length that is longer than the first stylus length; or longer, as configured to be utilized with a second stylus length that is shorter than the first stylus length.

In various implementations, the signal processing and control circuitry is further configured to perform a zeroing operation to adjust a zero position of the central high gain operating region. In various implementations, the signal processing and control circuitry is further configured to have at least a position range of the central high gain operating region increased to at least one of: encompass manufacturing tolerances during factory calibration; or encompass variations that may occur due to an orientation of the scanning probe during measurement operations.

In various implementations, the transition operation comprises reducing a power of the field generating coil configuration so as to reduce the ratio of the magnitude of output signal change to probe tip position change so as to correspond to the lower gain. In various implementations, reducing the power of the field generating coil comprises reducing the coil drive signal.

In various implementations, the signal processing and control circuitry comprises one or more variable gain amplifiers configured to amplify signals from coils of the stylus position detection portion, and the transition operation comprises reducing a gain of the one or more variable gain amplifiers so as to reduce the ratio of the magnitude of output signal change to probe tip position change so as to correspond to the lower gain.

In various implementations, the transition operation comprises altering a characteristic of one or more of the rotary sensing coils so as to reduce the ratio of the magnitude of output signal change to probe tip position change so as to correspond to the lower gain. In various implementations, the altering of the characteristic of the one or more rotary sensing coils comprises utilizing at least one of a relay or switch to effectively decrease the operating size of the one or more rotary sensing coils.

In various implementations, the signal processing and control circuitry comprises one or more analog to digital converters configured to convert analog signals from coils of the stylus position detection portion to digital signals, and the transition operation comprises altering an input range of the one or more analog to digital converters so as to reduce the ratio of the magnitude of output signal change to probe tip position change so as to correspond to the lower gain.

In various implementations, the determination that the probe tip has moved from a position in the central high gain probe tip position range to a position in the respective lower gain probe tip position range is made in accordance with an analysis of a position sample which comprises signals from coils of the stylus position detection. In various implementations, after the determination is made that the probe tip has moved into the respective lower gain probe tip position range as based on the analysis of the corresponding position sample, and after the transition operation has correspondingly been performed to lower the gain, a new position sample is obtained and is utilized to indicate the probe tip position instead of the position sample that was obtained before the transition operation was performed to lower the gain.

In various implementations, a method is provided including determining three-dimensional position information based on inductive sensing signals generated by the scanning probe as the scanning probe is moved along a surface of a workpiece. In various implementations, the determining of the three-dimensional position information based on inductive sensing signals generated by the scanning probe comprises: providing the coil drive signal; inputting signals comprising respective signal components provided by the respective rotary and axial sensing coils; outputting signals indicative of an axial position and a rotary position of the probe tip, and for which an output signal change correspondingly indicates a change in at least one of an axial or rotary position of the probe tip, and for which the three-dimensional position information is determined based on the output signals; and based on an indicated position of the probe tip, determining if a transition should be made from a central high gain operating region to a lower gain operating region; and performing a transition operation in response to a determination that a transition should be made from the central high gain operating region to a lower gain operating region, the transition operation resulting in transitioning from operating in the central high gain operating region with the high gain to operating in the respective lower gain operating region with the lower gain.

In various implementations, the central high gain operating region which corresponds to the central high gain probe tip position range also corresponds to a central high gain element position range, which corresponds to an angular position range of the disruptor element, and is configured to be utilized in combination with a stylus of a first stylus length, and the method further comprises modifying the central high gain element position range based on a determination that a stylus of a second length that is different than the first length has been coupled to the stylus coupling portion.

In various implementations the scanning probe is included in a system with a drive mechanism and an attachment portion that attaches the scanning probe to the drive mechanism.

DETAILED DESCRIPTION

Figure 1:
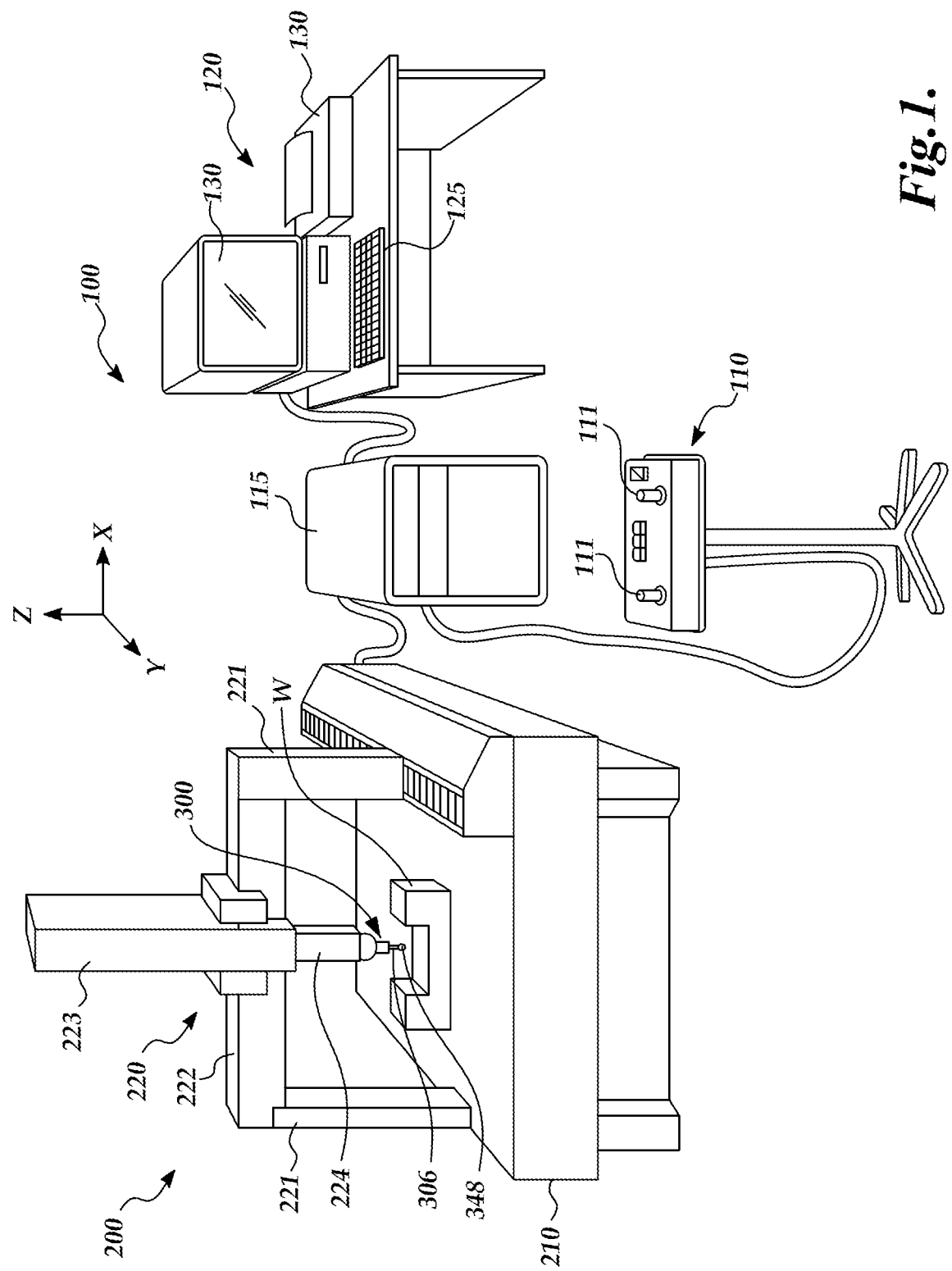
FIG. 1 is a diagram showing various typical components of a measuring system including a CMM utilizing a scanning probe such as that disclosed herein.

FIG. 1 is a diagram showing various typical components of a measuring system 100 including a CMM 200 utilizing a scanning probe 300 such as that disclosed herein. The measuring system 100 includes an operating unit 110, a motion controller 115 that controls movements of the CMM 200, a host computer 120, and the CMM 200. The operating unit 110 is coupled to the motion controller 115 and may include joysticks 111 for manually operating the CMM 200. The host computer 120 is coupled to the motion controller 115 and operates the CMM 200 and processes measurement data for a workpiece W. The host computer 120 includes input means 125 (e.g., a keyboard, etc.) for inputting, for example, measurement conditions, and output means 130 (e.g., a display, printer, etc.) for outputting, for example, measurement results.

The CMM 200 includes a drive mechanism 220 which is located on a surface plate 210, and an attachment portion 224 for attaching the scanning probe 300 to the drive mechanism 220. The drive mechanism 220 includes X axis, Y axis, and Z axis slide mechanisms 222, 221, and 223, respectively, for moving the scanning probe 300 three-dimensionally. A stylus 306 attached to the end of the scanning probe 300 includes a probe tip 348 (e.g., which may also or alternatively be referenced as a contact portion 348). As will be described in more detail below, the stylus 306 is attached to a stylus suspension portion of the scanning probe 300, which allows the probe tip 348 to freely change its position in three directions when the probe tip 348 moves along a measurement path on the surface of the workpiece W.

Figure 2:
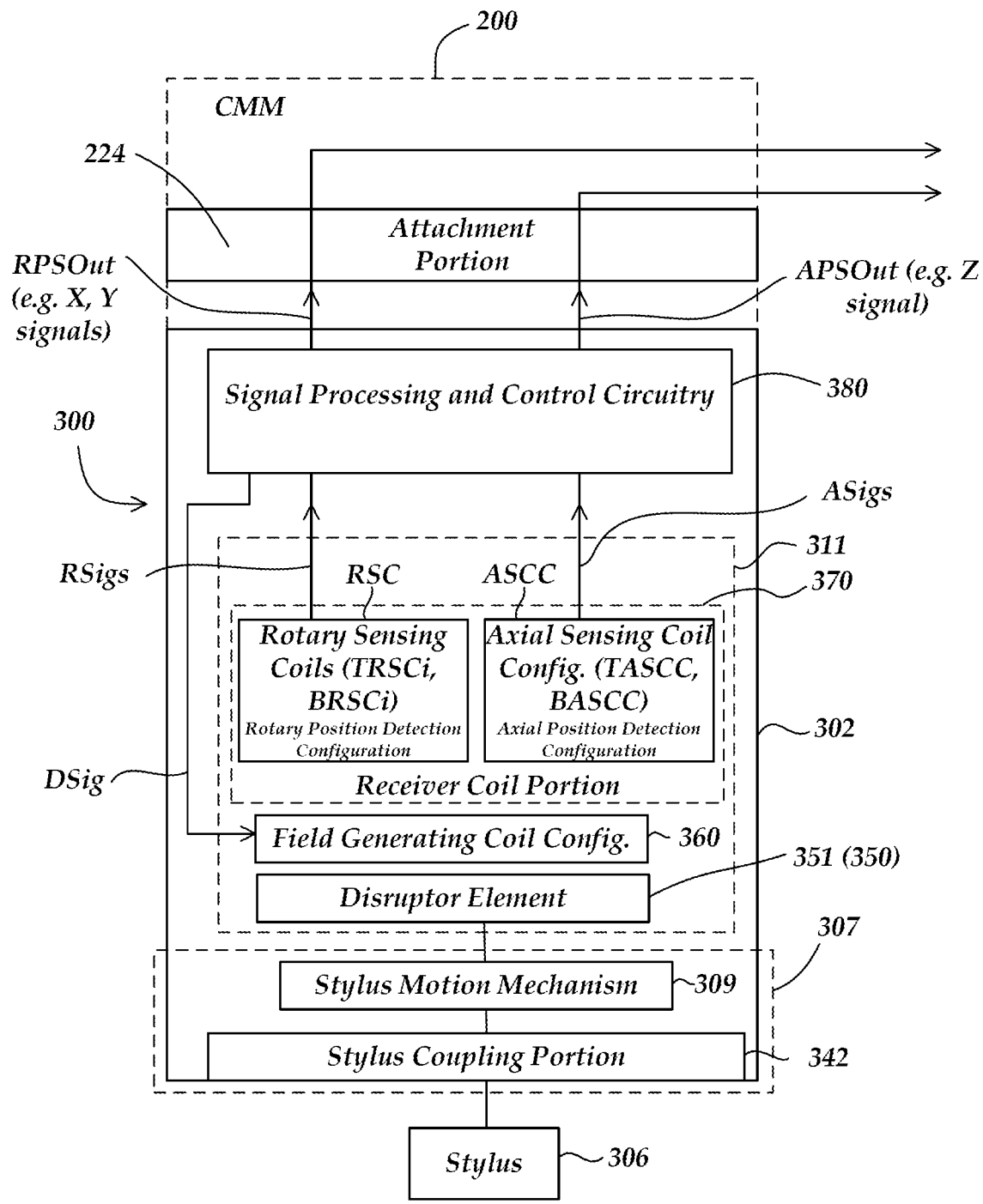
FIG. 2 is a block diagram showing various elements of a scanning probe as coupled to a CMM and providing rotary and axial position signals.

FIG. 2 is a block diagram showing various elements of a scanning probe 300 as coupled to a CMM 200 and providing rotary (e.g., X, Y) and axial (e.g., Z) position signals. The scanning probe 300 includes a probe main body 302 (e.g., comprising a frame) which incorporates a stylus suspension portion 307 and a stylus position detection portion 311. The stylus suspension portion 307 includes a stylus coupling portion 342 and a stylus motion mechanism 309. The stylus coupling portion 342 is rigidly coupled to a stylus 306. The stylus motion mechanism 309 is configured to enable axial motion of the stylus coupling portion 342 and attached stylus 306 along an axial direction, and to enable rotary motion of the stylus coupling portion 342 and attached stylus 306 about a rotation center, as will be described in more detail below with respect to FIGS. 3 and 4. Signal processing and control circuitry 380 included in the scanning probe 300 is connected to and governs the operation of the stylus position detection portion 311, and may perform related signal processing, all as described in greater detail below.

As shown in FIG. 2, the stylus position detection portion 311 uses inductive sensing principles and includes a receiver coil portion 370, a field generating coil configuration 360, and a disruptor element 351 (which may be part of a disruptor configuration 350, which may include a plurality of parts in some implementations). The receiver coil portion 370 may comprise a rotary sensing coil portion (also referred to as rotary sensing coils) RSC and an axial sensing coil configuration ASCC. Briefly, the moving disruptor element 351 (or more generally, the disruptor configuration 350) causes position-dependent variations in a changing magnetic field generated by the field generating coil configuration 360. The receiver coil portion 370 is responsive to the changing magnetic field and the variations therein caused by the disruptor element 351. In particular, the rotary sensing coil portion RSC outputs at least first and second rotary signal components RSigs that are indicative of the rotary position (e.g., X and Y position signals) of the stylus coupling portion 342 over corresponding signal lines, and the axial sensing coil configuration ASCC outputs one or more axial signal components ASigs that is indicative of the axial position (e.g., a Z position signal) of the stylus coupling portion 342 over corresponding signal lines, as described in greater detail below with reference to FIGS. 3, 5 and 6, for example. In various implementations, the signal processing and control circuitry 380 receives the rotary signal components RSigs and the axial signal components ASigs, and may perform various levels of related signal processing in various implementations. For example, in one implementation, the signal processing and control circuitry 380 may cause the signal components from various receiver coils to be combined and/or processed in various relationships, and provide the results in a desired output format as the rotary and axial position signal outputs RPSOut and APSOut, through the attachment portion 224. One or more receiving portions (e.g., in the CMM 200, motion controller 115, host computer 120, etc.) may receive the rotary and axial position signal outputs RPSOut and APSOut, and one or more associated processing and control portions may be utilized to determine a three-dimensional position of the stylus coupling portion 342 and/or of the probe tip of the attached stylus 306 as its probe tip 348 moves along a surface of a workpiece W that is being measured.

Figure 3:
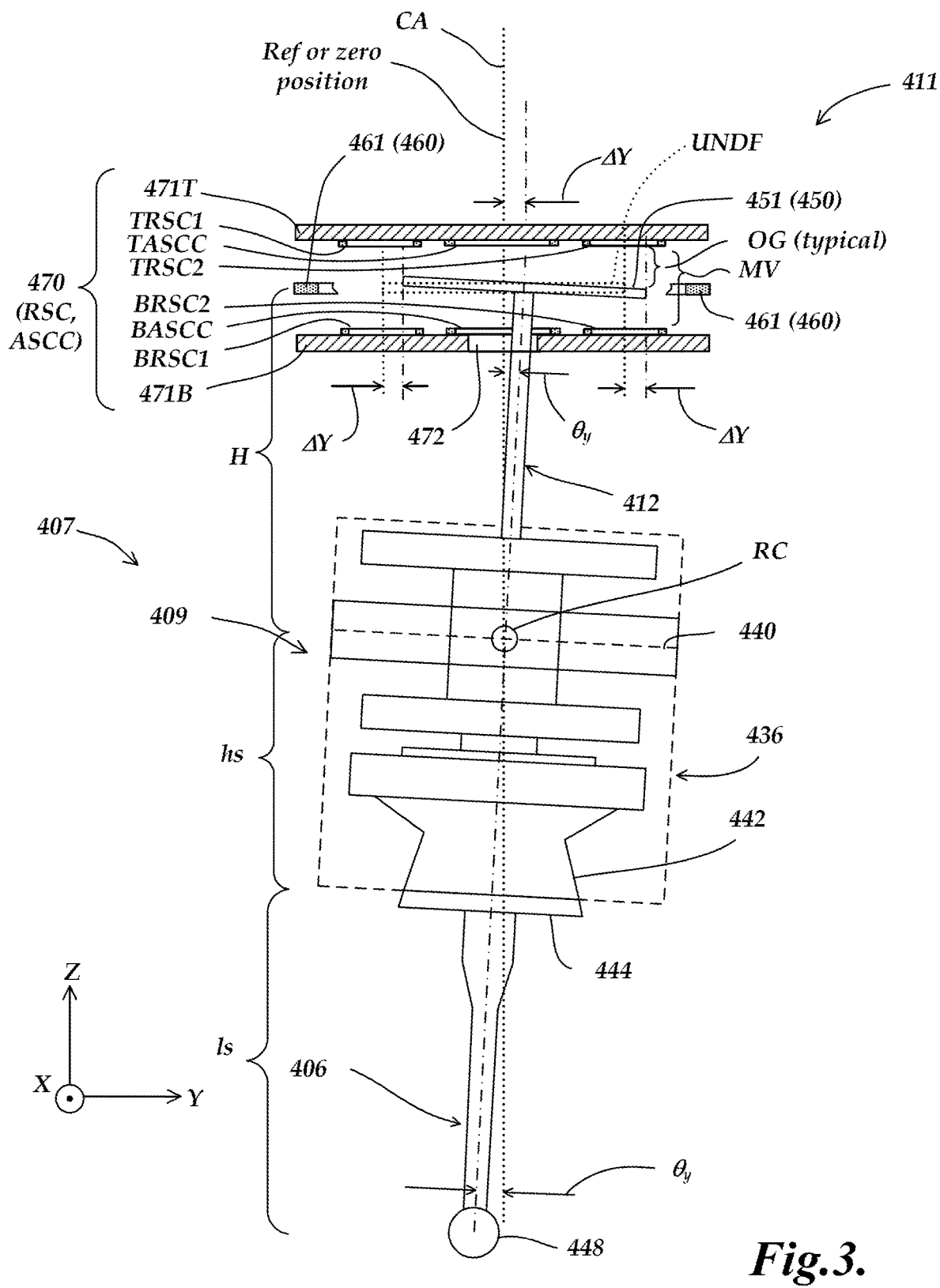
FIG. 3 is a diagram showing portions of a first exemplary implementation of a stylus suspension portion as coupled to a stylus and a first exemplary implementation of a stylus position detection portion for detecting the position of the stylus suspension portion.

FIG. 3 is partially schematic diagram showing portions of a first exemplary implementation of a schematically represented stylus suspension portion 407 as coupled to a stylus 406, along with a partially schematic cross-section of a first exemplary implementation of a stylus position detection portion 411 for detecting the position of the stylus suspension portion 407 and/or the stylus 406. It will be appreciated that certain numbered components 4XX of FIG. 3 may correspond to and/or have similar operations as similarly numbered counterpart components 3XX of FIG. 2, and may be understood by analogy thereto and as otherwise described below. This numbering scheme to indicate elements having analogous design and/or function is also applied to the following FIGS. 4-12. As shown in FIG. 3, the stylus suspension portion 407 includes a stylus motion mechanism 409 and a stylus coupling portion 442. The stylus coupling portion 442 is configured to be rigidly coupled to a stylus 406 which has a probe tip 448 for contacting a surface S of a workpiece W (not shown).

As will be described in more detail below with respect to FIG. 4, the stylus motion mechanism 409 is attached to a frame of the scanning probe, and is configured to enable axial and rotary motion of the stylus coupling portion 442 and attached stylus 406 so that the probe tip 448 can change its position in three directions along the shape of the surface S. For purposes of illustration, the vertical and horizontal directions on the plane of paper in FIG. 3 are defined as Z and Y directions, respectively, and the perpendicular direction to the plane of the paper is defined as the X direction. The direction of a central axis CA, also referred to as the axial direction, of the measuring probe 300 coincides with the Z direction in this illustration.

In FIG. 3, rotary motion portions of the stylus motion mechanism 409 are represented, including a rotating member 436, a flexure element 440, and a moving member 412 disposed within the rotating member 436. As will be described in more detail below with respect to FIG. 4, the flexure element 440 enables rotary motion of the rotating member 436 about a rotation center RC. As will be described in more detail below, in various implementations rotary sensing coils TRSCi and BRSCi (where i is an index integer which identifies specific coils) and stylus position detection portion 411 are able to sense the rotated position of the disruptor element 451 and thereby the rotated position of the moving member 412 (e.g., in X and Y directions), and the axial sensing coil configurations (also referred to as the axial sensing coils) TASCC and BASCC are able to sense the axial position of the disruptor element 451 and thereby the axial position of the moving member 412 (e.g., in the Z direction).

As shown in FIG. 3, a first exemplary implementation of a stylus position detection portion 411 includes a disruptor element 451 (or more generally a disruptor configuration 450) that is coupled to the moving member 412 and which moves relative to the scanning probe frame (e.g., wherein the frame is included as part of the scanning probe body, etc.), within a disruptor motion volume MV located between the top and bottom coil substrates 471T and 471B, respectively. As shown in FIG. 3, the moving member 412 extends through and moves in a hole 472 located along the central axis CA in a bottom coil substrate 471B. The attached disruptor element 451 moves in the disruptor motion volume MV relative to an undeflected position UNDF (e.g., which may also correspond to a zero or reference position) in response to a deflection of the stylus suspension portion 407 and the moving member 412.

Various other components of the stylus position detection portion 411 (e.g., the receiver coil portion 470 and the field generating coil configuration 460), may be fixed relative to the frame unless otherwise indicated. In the implementation shown in FIG. 3, the field generating coil configuration 460 comprises a single planar field generating coil 461 that is located approximately at a midplane of the disruptor motion volume MV and that is nominally planar and orthogonal to the central axis CA. As previously outlined with reference to FIG. 2, the receiver coil portion 470 may generally comprise a rotary sensing coil portion (also referred to as rotary sensing coils) RSC and an axial sensing coil configuration ASCC. The rotary position detection configuration RSC generally includes top rotary sensing coils TRSCi and bottom rotary sensing coils BRSCi. In the cross section shown in FIG. 3, only two top rotary sensing coils TRSC1 and TRSC2, and two bottom rotary sensing coils BRSC1 and BRSC2, are shown. These rotary sensing coils may provide signal components indicative of the position of the disruptor element 451 along the Y direction. In particular, their signal components vary depending on an amount of displacement ΔY of the disruptor element 451 along the Y direction, and are therefore indicative of the amount of displacement ΔY. The displacement ΔY determines an associated amount of "overlap" between the disruptor element 451 and the various rotary sensing coils TRSCi and BRSCi, and thereby their amount of coupling to the changing magnetic field generated by the field generating coil 461 (which determines the resultant signal components). Other rotary sensing coils (not shown) may provide signal components which are indicative of the position of the disruptor element 451 along the X axis direction.

The axial sensing coil configuration ASCC generally includes a top axial sensing coil configuration TASCC and a bottom axial sensing coil configuration BASCC. In the implementation shown in FIG. 3, the top axial sensing coil configuration TASCC comprises a single top axial sensing coil that at least partially surrounds the central axis CA, and the at least one bottom axial sensing coil comprises a single bottom axial sensing coil that at least partially surrounds the central axis CA, as shown. These axial sensing coils are always completely "overlapped" by the disruptor element 451, in this particular example embodiment. Therefore, their signal components are nominally only responsive to the position of the disruptor element 451 along the axial or Z direction, and are indicative of the position of the disruptor element 451 along the Z direction. The generation of various signal components is described in greater detail below with reference to FIGS. 5 and 6.

Similar to operations previously outlined with reference to FIG. 2, in operation the moving disruptor element 451 causes position-dependent local variations in a changing magnetic field along the axial direction generated by the field generating coil 461. The receiver coil portion 470 is responsive to the changing magnetic field and the variations therein caused by the disruptor element 451, and outputs the rotary signal components RSigs and the axial signal components ASigs that may be processed to determine the rotary position of the disruptor element 451 (e.g., a Y and X position, and corresponding signals) and its axial position (e.g., a Z position), as previously outlined with reference to FIG. 2, and as described in detail further below. It will be appreciated that the position of the disruptor element 451 is related by a known geometry to the position of the stylus coupling portion 442 and/or its probe tip 448, such that signals/positions that are indicative of one of the positions are also indicative of the other positions. For example, for small rotation angles, for the illustrated movement or displacement ΔY of the disruptor element 451 along the Y direction away from null (e.g., from the undeflected position UNDF):

$$\Delta Y = H \theta_Y \quad \text{(Eq. 1)}$$

where H is the distance from the rotation center RC to the nominal plane of the disruptor element 451, and $\theta_Y$ is the rotary motion tilt of the rotating member 436 (and the moving member 412) in a plane parallel to the Y direction (i.e., that is, rotation about an axis parallel to the X axis at the rotation center RC). If a larger rotation angle is used in various implementations, an analogous expression that is accurate for larger rotation angles may be used, as is known in the art. The Y direction movement or displacement $Y_{STYLUS}$ away from null (e.g., corresponding to the undeflected position UNDF) of the probe tip 448 of the stylus 406 in relation to the rotary motion tilt component $\theta_Y$ may be approximated as:

$$\Delta Y_{STYLUS} = \theta_Y * (h_S + I_S) \quad \text{(Eq. 2)}$$

where $h_S$ is the distance from the end of the stylus coupling portion 442 to the rotation center RC, and $I_S$ is the length of the stylus 406. Combining EQUATIONS 1 and 2, the ratio of the displacement ΔY of the disruptor element 451 in relation to the Y direction displacement at the probe tip 448 may be approximated as:

$$\Delta Y / \Delta Y_{STYLUS} = H / (h_S + I_S) \quad \text{(Eq. 3)}$$

It will be appreciated that the X coordinate motion components are analogous to the above expressions, and will not be explained in further detail herein. The stylus length $I_S$ for various styli may be utilized in the equations (e.g., with respect to the trigonometry of the system) for determining the X-Y position of the probe tip 448 based on the signals from the rotary sensing coils RSC (i.e., as indicating the X-Y position of the disruptor element 451). Regarding the Z coordinate displacement or position component, a displacement ΔZ (not shown) of the disruptor element 451 along the axial or Z direction away from null (e.g., corresponding to the undeflected position UNDF), in relation to the Z direction displacement $\Delta Z_{STYLUS}$ at a stylus contact portion (e.g., the probe tip 448) may be approximated as:

$$\Delta Z / \Delta Z_{STYLUS} \approx 1 \quad \text{(Eq. 4)}$$

Figure 4:
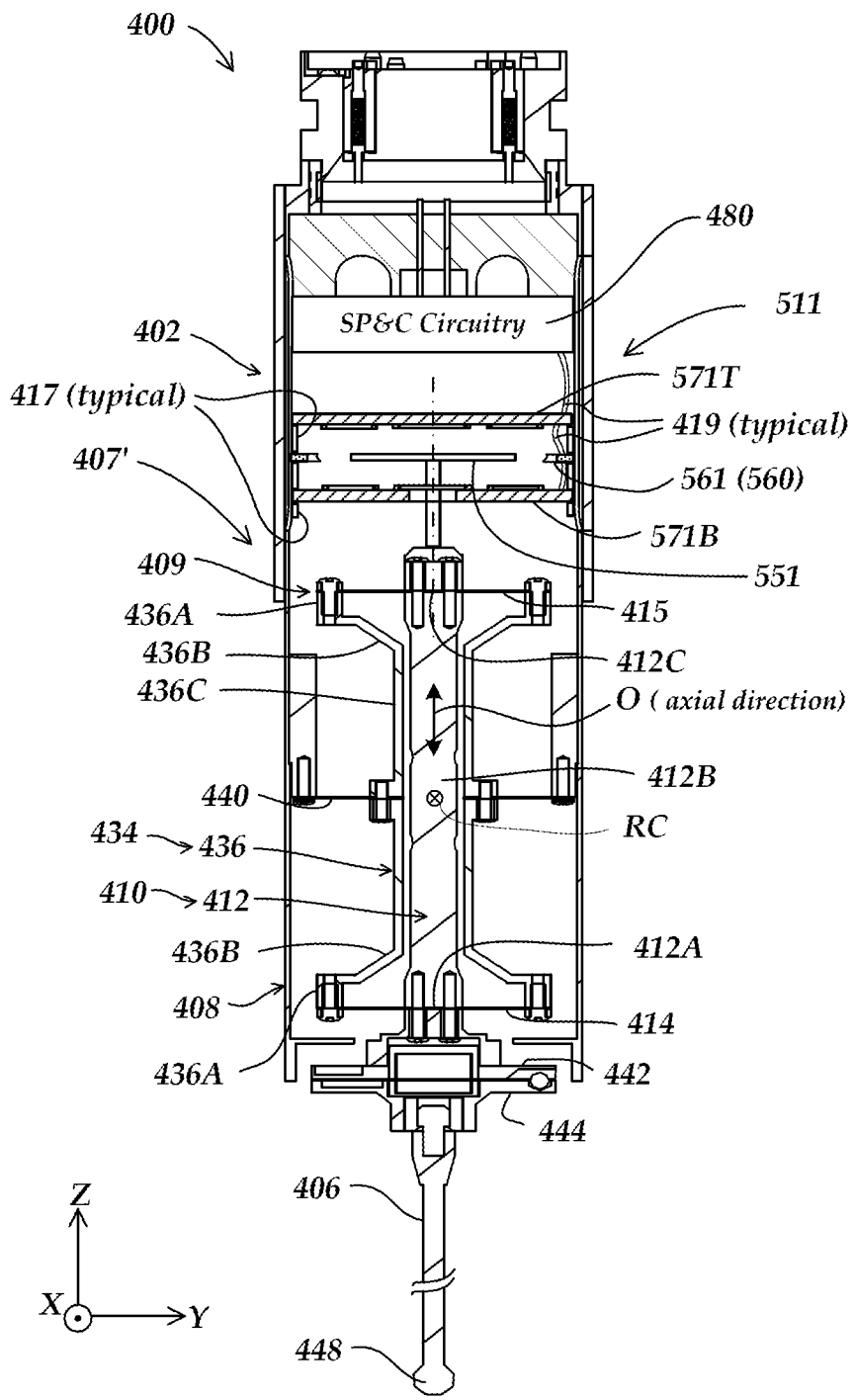
FIG. 4 is a diagram showing a cross section of one implementation of the stylus suspension portion of FIG. 3 as included within a main body frame of a scanning probe.

FIG. 4 is a partially schematic diagram showing a cross section of one implementation of a stylus suspension portion 407' usable as the stylus suspension portion 407 represented in FIG. 3, as well as one implementation of a stylus position detection portion 511 that is similar to the stylus position detection portion 411 shown in FIG. 3, and signal processing and control circuitry 480. The foregoing elements are shown as included within a frame 408 of a probe main body 402 of a scanning probe 400. The substrates 571T, 571B, and the field generating coil 561 or its substrate (e.g., printed circuit type substrates) of the stylus position detection portion 511 may be positioned for proper operation in the scanning probe 400 using alignment and mounting portions 417, or other known techniques. Various signal connections associated with the stylus position detection portion 511 may be provided by connectors (e.g., flex print and/or wire connections) 419, or the like, according to known techniques. In some implementations, some or all of the signal processing and control circuitry 480 may be provided as a separate circuit assembly as represented in FIG. 4. In other implementations, some or all of the signal processing and control circuitry 480 may be combined on the substrates of the stylus position detection portion 511, if desired.

As shown in FIG. 4, the stylus suspension portion 407' includes a stylus motion mechanism 409 and a stylus coupling portion 442 which is coupled to a stylus 406. The stylus motion mechanism 409 may include a moving member 412, a rotating member 436, a flexure element 440 coupled to the main body frame 408 for supporting and enabling rotary motion of the rotating member 436, and flexure elements 414 and 415 (i.e., referenced as first flexure elements) supporting the moving member 412 and coupling it to the rotating member 436 for enabling axial motion of the moving member 412. The scanning probe 400 includes the stylus position detection portion 511 having components and operation described in greater detail below with reference to FIG. 5, for determining the position and/or motion of the stylus motion mechanism 409 and/or the probe tip 448 of the stylus 406.

The flexure element 440 (i.e., referenced as a second flexure element) may be disposed between the respective planes of a pair of flexure elements 414 and 415 (i.e., referenced as first flexure elements) in the axial direction O. Flexure designs suitable for the flexure elements 414, 415 and 440 may be determined according to principles known in the art. For example, one possible implementation is illustrated in U.S. Pat. No. 9,791,262, which is hereby incorporated herein by reference in its entirety. The rotating member 436 may have a shape symmetric about the second flexure element 440 and may integrally include: two ring portions 436A; two connecting portions 436B; and a cylindrical portion 436C. Peripheral portions of the first flexure elements 414 and 415 are fixed to the ring portions 436A. The connecting portions 436B extend inside of the ring portions 436A so as to connect to the cylindrical portion 436C, which has a hollow center. The first flexure elements 414 and 415 may be disposed at a symmetric distance with respect to the second flexure element 440, although such an implementation is exemplary only and not limiting.

An axial motion mechanism 410 including the moving member 412 is supported inside of the rotating member 436, and the rotating member 436 and the axial motion mechanism 410 together constitute a motion module that is part of the stylus motion mechanism 409. The axial motion mechanism 410 allows the probe tip 448 to move in the axial direction O. The rotary motion mechanism 434 including the rotating member 436 allows the probe tip 448 of the stylus 406 to move transverse (e.g., approximately perpendicular) to the axial direction O by means of rotary motion about the rotation center RC.

The moving member 412 integrally includes: a lower portion 412A; a rod portion 412B; and an upper portion 412C. As previously outlined with reference to FIG. 3, and described in more detail below with respect to the stylus position detection portion 511 shown in FIG. 5, the disruptor element 551 that is attached to the upper portion 412C of the moving member 412 functions as both a rotary and axial position indicating element. The rod portion 412B is disposed between the pair of first flexure elements 414 and 415. The rod portion 4126 is housed in the rotating member 436. The lower portion 412A is formed below the rod portion 412B and a stylus coupling portion 442 (e.g., a flange member) is attached to the lower portion 412A. A flange part 444 is provided for attachment of the stylus 406. The flange part 444 and the stylus coupling portion 442 together may constitute a detachable coupling mechanism (e.g., a known type of kinematic joint or coupling) which allows attachment and detachment between various styli 406 and the stylus coupling portion 442 with repeatable positioning (e.g., in the case of a collision knocking off a stylus, or when intentionally changing styli).

Figure 5:
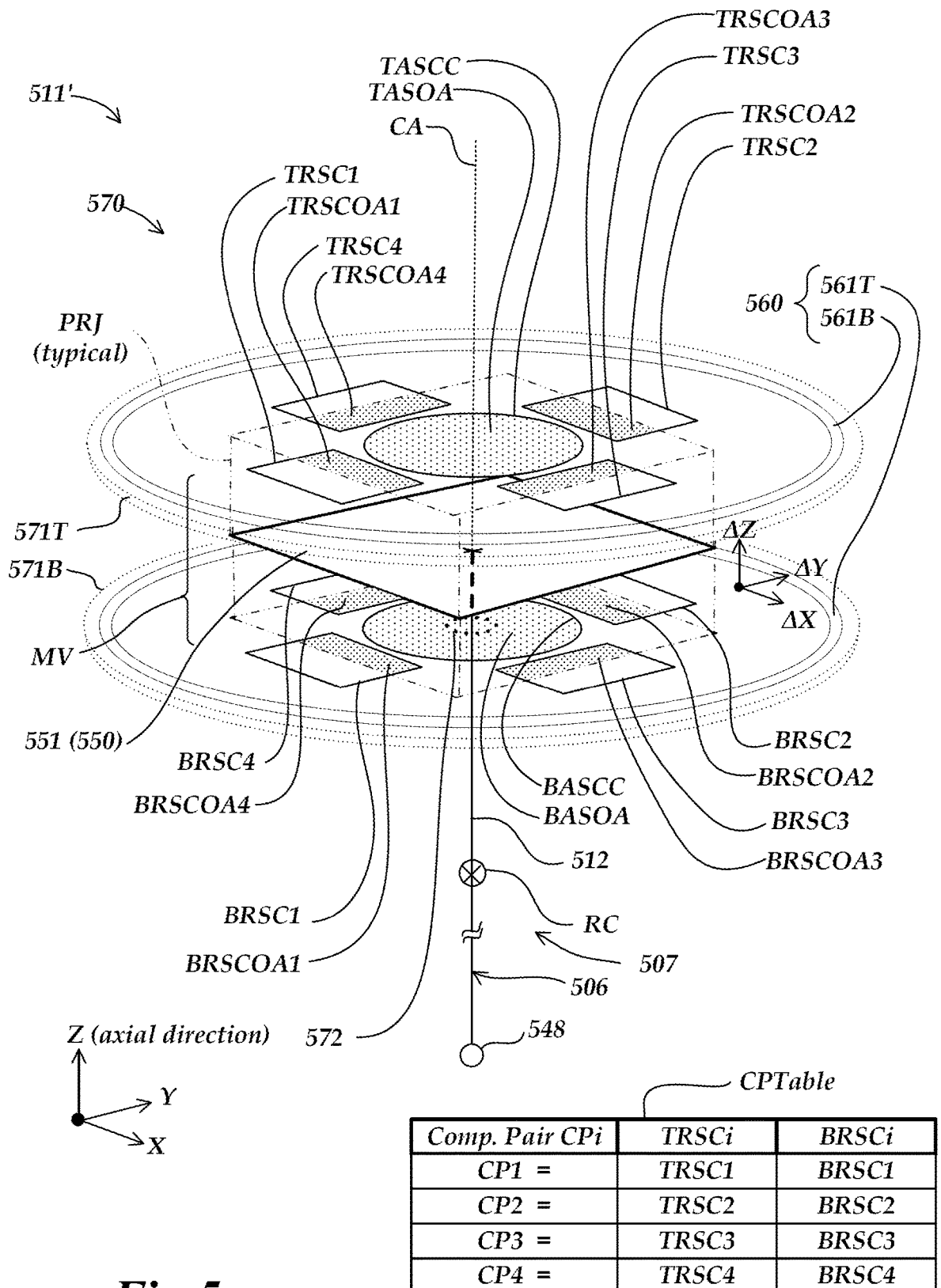
FIG. 5 is a partially schematic isometric diagram of an alternative implementation of the stylus position detection portion shown in FIGS. 3 and 4.

FIG. 5 is a partially schematic isometric diagram of an implementation of a stylus position detection portion 511' that is similar to a stylus position detection portion 511 shown in FIG. 4, emphasizing certain aspects. The stylus position detection portions 511' and 511 are similar except for a difference in the field generating coil configuration 560, as explained further below. In general, the stylus position detection portion 511' includes certain components that are similar to those of the stylus position detection portions 311, 411 and 511 of FIGS. 2, 3 and 4, and will be understood to operate similarly except as otherwise described below.

In the implementation shown in FIG. 5, the stylus position detection portion 511' comprises the receiver coil portion 570, the disruptor configuration 550 comprising the disruptor element 551, and the field generating coil configuration 560. In various implementations, disruptor element 551 (or more generally the disruptor configuration 550) may comprise a conductive plate or conductive loop, or parallel conductive plates or conductive loops (e.g., as fabricated on two sides of a printed circuit substrate, patterned by printed circuit board fabrication techniques), or any other desired operational configuration that provides a disruptor area (e.g., its interior area). The disruptor element 551 is located along the central axis CA in the disruptor motion volume MV between the top and bottom coil substrates 571T and 571B and is coupled to the stylus suspension portion 507 by a coupling configuration (e.g., comprising the moving member 512). For purposes of explanation, the disruptor element 551 may be described as moving relative to the undeflected position illustrated in FIG. 5 (see the undeflected position UNDF, in FIG. 3) in response to a deflection of the stylus suspension portion 507 and/or the stylus 506 and/or the moving member 512. The disruptor element may be described as moving with displacement increments ΔZ over an operating motion range +/−Rz along the axial direction in response to axial motion, and with displacement increments ΔX and ΔY over respective operating motion ranges +/−Rx and +/−Ry along orthogonal X and Y directions that are orthogonal to the axial direction (Z direction) in response to rotary motion. The specified or expected operating motion ranges are described in greater detail below.

Figure 6:
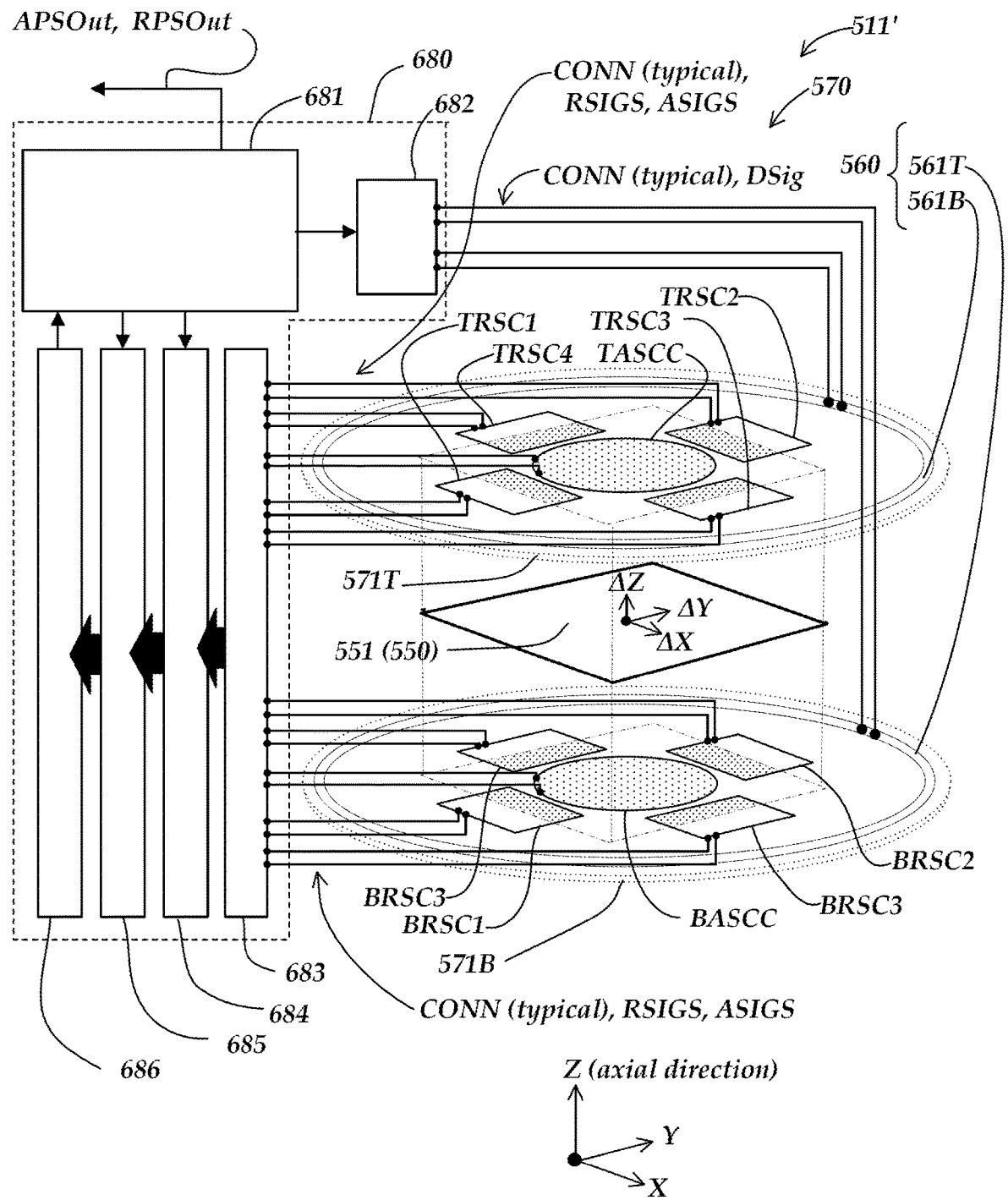
FIG. 6 is a partially schematic isometric diagram of certain elements of the stylus position detection portion shown in FIG. 5.

The receiver coil portion 570 may comprise the planar top coil substrate 571T including N top rotary sensing coils TRSC (e.g., TRSC1-TRSC4, where N=4) and a top axial sensing coil configuration TASCC (e.g., comprising the single illustrated individual coil in this implementation), and a planar bottom coil substrate 571B including N bottom rotary sensing coils BRSC (e.g., BRSC1-BRSC4, where N=4) and a bottom axial sensing coil configuration BASCC (e.g., comprising the single illustrated individual coil in this implementation). The top and bottom coil substrates 571T and 571B are mounted in a fixed relationship to the frame of the scanning probe with the bottom coil substrate closer to the stylus 506 and/or the stylus suspension portion 507. The top and bottom coil substrates 571T and 571B may be nominally parallel to one another and nominally orthogonal to the central axis CA, and are spaced apart along the central axis CA with the disruptor motion volume MV located therebetween. It should be appreciated that although the various sensing coils shown in FIG. 5 are represented by "closed loops" for simplicity of illustration, all coils comprise windings or conductors that have first and second connection ends (e.g., as represented in FIG. 6) that are configured to operate as one or more inductively coupled "turns".

The field generating coil configuration (e.g., the field generating coil configuration 560) generally comprises at least a first field generating coil that is located proximate to the disruptor motion volume MV and that is nominally planar and orthogonal to the central axis CA. In contrast to the single planar field generating coil 461 in the implementation shown in FIG. 3 (which is located approximately at a midplane of the disruptor motion volume MV), in the implementation shown in FIG. 5, the field generating coil configuration 560 comprises a pair of planar field generating coils 561T and 561B (located on the top and bottom coil substrates 571T and 571B, respectively) that is approximately equidistant from a midplane of the disruptor motion volume MV along the central axis CA, and that are nominally planar and orthogonal to the central axis CA. Generally speaking, either of the field generating coil configurations 460 or 560 may be used with the receiver coil portion 570. In certain implementations, it may be desirable that the field generating coil configuration comprises at least a first field generating coil that is configured such that a projection of its coil area along the axial direction (Z direction) encompasses the conductive plate or loop that provides the disruptor area of the disruptor configuration 560 (e.g., of the disruptor element 551) and a coil area of all the rotary and axial sensing coils RSCi and ASCC located on the top and bottom coil substrates 571T and 571B. In general, the field generating coil configuration is configured to generate a changing magnetic flux generally along the axial direction in the disruptor motion volume MV in response to a coil drive signal, as desired for operation of the stylus position detection portion 511'. It should be appreciated that, although the various field generating coils shown in FIG. 5 are represented by a single "closed loop" comprising a wide flat conductive trace (the edges of which are shown) for simplicity of illustration, in an actual device all coils comprise windings or conductors that have first and second connection ends (e.g., as represented in FIG. 6), and are configured to operate as one or more field generating "turns".

As illustrated in FIG. 5, a projection of the disruptor element 551 along the axial direction (e.g., as shown by fine dashed lines PRJ in FIG. 5) through an interior coil area of the top axial sensing coil configuration TASCC defines a top axial sensing overlap area TASOA (indicated by a dot pattern filling that interior coil area), and a projection of the disruptor element 551 along the axial direction through an interior coil area of the bottom axial sensing coil configuration BASCC defines a bottom axial sensing overlap area BASOA (indicated by a dot pattern filling that interior coil area). Similarly, a projection of the disruptor element 551 along the axial direction through an interior coil area of any respective top rotary sensing coil TRSCi (e.g., TRSC1-TRSC4) defines a respective top rotary coil sensing overlap area TRSCOAi (e.g., TRSCOA1-TRSCOA4), as indicated by a dot pattern filling the various respective overlap areas shown in FIG. 5, where i is an individual coil identification index in the range 1 to N. A projection of the disruptor element 551 along the axial direction through an interior coil area of any respective bottom rotary sensing coil BRSCi (e.g., BRSC1-BRSC4) defines a respective bottom rotary coil sensing overlap area BRSCOAi (e.g., TRSCOA1-TRSCOA4), as indicated by a dot pattern filling the various respective overlap areas shown in FIG. 5.

Regarding axial position detection in a stylus position detection portion (e.g., 511'), the receiver coil portion (e.g., 570) and the disruptor element (e.g., 551) are generally configured to provide a top axial sensing overlap area TASOA and bottom axial sensing overlap area BASOA wherein an amount of each of the overlap areas TASOA and BASOA is unchanged or independent of the position of the disruptor element 551 within operating motion ranges +/−Rz, +/−Rx, and +/−Ry. It will be appreciated that, for a particular scanning probe, the operating motion ranges may be prescribed or specified in combination with the configuration of the probe's particular stylus position detection portion, if needed, in order to fulfill this requirement. In this way, the signal components generated in the top and bottom axial sensing coil configurations TASCC and BASCC are nominally independent of the rotary motion (that is the position of the disruptor element 551 along the X and Y directions), and are nominally sensitive only to variations in "proximity" or gap to the disruptor element 551, which varies depending on the axial (Z) position or displacement ΔZ of the disruptor element 551. In operation, currents induced in the disruptor element 551 by the changing magnetic field of the field generating configuration 560 cause opposing magnetic fields. Generally speaking, as the disruptor element 551 moves upward along the axial (Z) direction in FIG. 5, the opposing magnetic fields couple more strongly to the top axial sensing coil configurations TASCC, reducing its signal component that arises from the changing magnetic field. Conversely, the opposing magnetic fields couple more weakly to the bottom axial sensing coil configurations BASCC, increasing its signal component that arises from the changing magnetic field. By a convention used in this disclosure, we may refer to a signal component SIGTASCC as the signal component arising from a particular top axial sensing coil configuration (or coil) TASCC, and so on.

It will be appreciated that at the undeflected position UNDF, the net signal components SIGTASCC and SIGBASCC may be approximately balanced. For small displacements ΔZ, such as those expected in operation, the net signal components SIGTASCC and SIGBASCC may vary approximately linearly, and inversely compared to one another. In one implementation, an axial displacement or position ΔZ may be indicated by, or correspond to, the signal relationship:

$$\Delta Z = \text{function of } [(\text{SIGBASCC} - \text{SIGTASCC})/(\text{SIGBASCC} + \text{SIGTASCC})] \quad \text{(Eq. 5)}$$

This signal relationship is exemplary only, and not limiting. In various implementations, this signal relationship may be adjusted or compensated by additional calibration or signal processing operations, including operations that reduce the effects of geometric and/or signal cross-coupling between various displacement directions or signal components, if desired. In various implementations, the top axial sensing coil configuration may comprise at least one top axial sensing coil that is not one of the N top rotary sensing coils and that is arranged closer to the central axis than the top rotary sensing coils, and the at least one top axial sensing coil and the disruptor element are characterized in that the at least one top axial sensing coil has an interior coil area that is smaller than the disruptor element, and a projection of the disruptor element along the axial direction completely fills the interior coil area of the at least one top axial sensing coil for any position of the disruptor element within the operating motion ranges +/−Rz, +/−Rx, and +/−Ry, whereby the top axial sensing overlap area TASOA is unchanged by the position of the disruptor element. Similarly, in various such implementations, the bottom axial sensing coil configuration may comprise at least one bottom axial sensing coil that is not one of the N bottom rotary sensing coils and that is arranged closer to the central axis than the bottom rotary sensing coils, and the at least one bottom axial sensing coil and the disruptor element are characterized in that the at least one bottom axial sensing coil has an interior coil area that is smaller than the disruptor element and a projection of the disruptor element along the axial direction completely fills the interior coil area of the at least one bottom axial sensing coil for any position of the disruptor element within the operating motion ranges +/−Rz, +/−Rx, and +/−Ry, whereby the bottom axial sensing overlap area TASOA is unchanged by the position of the disruptor element. It may be seen that the particular implementation of the stylus position detection portion 511' shown in FIG. 5, wherein the top axial sensing coil configuration TASCC and the bottom axial sensing coil configuration BASCC each comprise a single sensing coil, conforms to this description. It will be appreciated that various configurations of the top and bottom axial sensing coil configurations TASCC and BASCC may be used, and the particular configurations shown in FIG. 5 are exemplary only and not limiting.

Regarding rotary position detection in a stylus position detection portion (e.g., 511'), the receiver coil portion (e.g., 570) and the disruptor element (e.g., 551) are generally configured to provide N complementary pairs of rotary sensing coils CPi (e.g., CP1-CP4, where N=4) that each comprise a top rotary sensing coil TRSCi and a bottom rotary sensing coil BRSCi, wherein for any complementary pair CPi, and for any disruptor element displacement increment within the operating motion ranges +/−Rz, +/−Rx, and +/−Ry, the magnitude of the change in overlap areas TRSCOAi and BRSCOAi associated with that disruptor displacement increment is nominally the same in that complementary pair. It will be appreciated that for a particular scanning probe the operating motion ranges may be prescribed or specified in combination with the configuration of its particular stylus position detection portion, if needed in order to fulfill this requirement. The table CPTable in FIG. 5 indicates the respective members TRSCi and BRSCi of each respective complementary pair CPi for the implementation shown in FIG. 5.

By conforming to the foregoing principle, the complementary pairs CPi shown in FIG. 5 may be used to compensate or eliminate certain cross-coupling errors, and/or to simplify the signal processing required to provide precise rotary position or displacement measurements (e.g., along the X and/or Y directions). In particular, pairs of signal components arising in complementary pairs CPi of rotary sensing coils in the implementation shown in FIG. 5 may be combined or processed in a relationship that provides a resulting output signal that is nominally insensitive to variations in "proximity" or gap between the individual coils of the complementary pair and the disruptor element 551. That is, the resulting output signal may be insensitive to the axial (Z) position or displacement $\Delta Z$ of the disruptor element 551, and nominally only sensitive to a rotary position or displacement (e.g., along the X and/or Y directions), as described in greater detail below. For the particular implementation shown in FIG. 5, it may be understood that a displacement of the disruptor element 551 that has a displacement component $\Delta Y$ along the Y axis direction will increase (or decrease) the overlap areas TRSCOA2 and BRSCOA2 in the complementary pair CP2 and decrease (or increase) the overlap areas TRSCOA1 and BRSCOA1 in the complementary pair CP1. Similarly, a displacement of the disruptor element 551 that has a displacement component $\Delta X$ along the X axis direction will increase (or decrease) the overlap areas TRSCOA3 and BRSCOA3 in the complementary pair CP3 and decrease (or increase) the overlap areas TRSCOA4 and BRSCOA4 in the complementary pair CP4.

As previous outlined, in operation, currents induced in the disruptor element 551 by the changing magnetic field of the field generating configuration 560 cause opposing magnetic fields. Generally speaking, the signal component SIGTRSCi (or SIGBRSCi) generated in any rotary sensing coil TRSCi (or BRSCi), will be reduced as a proximate portion of the disruptor element 551 comes closer to that rotary sensing coil along the axial direction, or increases its overlap TRSCOAi (or BRSCOAi) with the rotary sensing coil.

It will be appreciated that for the complementary pairs CP1-CP4 indicated in FIG. 5 (wherein the coils in a complementary pair CPi may be identical and aligned along the axial direction), at the illustrated undeflected position UNDF, the signal components in each complementary pair (e.g., SIGTRSC1 and SIGBRSC1) may be approximately balanced. According to previously outlined principles, for a portion of the disruptor element 551 proximate to a complementary pair (e.g., CP1), for small displacements $\Delta Z$ such as those expected in operation, the net signal components (e.g., SIGTRSC1 and SIGBRSC1) may vary approximately linearly, and inversely compared to one another. Thus, the sum of such signals for a complementary pair CPi may be nominally insensitive to a $\Delta Z$ associated with the proximate portion of the disruptor element 551. Furthermore, in the implementation shown in FIG. 5, the edges of the disruptor element 551 may be parallel to the X and Y directions, such that, within the operating motion ranges +/-Rx and +/-Ry, a Y direction displacement component does not alter the rotary coil sensing overlap areas TRSCOA3, BRSCOA3, and/or TRSCOA4 and BRSCOA4, and an X direction displacement component does not alter the rotary coil sensing overlap areas TRSCOA2, BRSCOA2, and/or TRSCOA1 and BRSCOA1. Therefore, in one implementation, a rotary displacement or position component $\Delta X$ along the X direction may be indicated by or correspond to the following signal relationship, ideally regardless of $\Delta Z$ and/or $\Delta Y$:

$$\Delta X=\text{function of } [(SIGTRSC3+SIGBRSC3)-(SIGTRSC4+SIGBRSC4)]\div[(SIGTRSC3+SIGBRSC3)+(SIGTRSC4+SIGBRSC4)] \quad \text{(Eq. 6)}$$

Similarly, in one implementation, a rotary displacement or position component $\Delta Y$ along the Y direction may be indicated by or correspond to the following signal relationship, ideally regardless of $\Delta Z$ and/or $\Delta X$:

$$\Delta Y=\text{function of } [(SIGTRSC2+SIGBRSC2)-(SIGTRSC1+SIGBRSC1)]\div[(SIGTRSC2+SIGBRSC2)+(SIGTRSC1+SIGBRSC1)] \quad \text{(Eq. 7)}$$

These signal relationships are exemplary only, and not limiting. In various implementations, these signal relationships may be adjusted or compensated by additional calibration or signal processing operations, including operations that reduce the effects of geometric and/or signal cross-coupling between various displacement directions or signal components, if desired.

In some particularly advantageous implementations, the receiver coil portion (e.g., 570) and the disruptor element (e.g., 551) are configured wherein, for any complementary pair CPi and any disruptor element displacement increment within the operating motion ranges +/-Rz, +/-Rx, and +/-Ry, both the magnitude and sign of the change in overlap areas TRSCOAi and BRSCOAi associated with that disruptor displacement increment are the same in that complementary pair. In some such implementations, the receiver coil portion is configured wherein each complementary pair CPi comprises a top rotary sensing coil TRSCi and a bottom rotary sensing coil BRSCi characterized in that the shape of their interior areas nominally coincide when projected along the axial direction. It may be seen that the particular implementation of the stylus position detection portion 511' shown in FIG. 5 conforms to this description. However, it will be appreciated that various configurations of complementary pairs may be used, and the particular configurations shown in FIG. 5 are exemplary only and not limiting.

In some implementations, the receiver coil portion (e.g., 570) and the disruptor element (e.g., 551) may be configured wherein the disruptor element comprises at least N straight sides, and, for any respective complementary pair CPi, a respective one of the straight sides of the disruptor element transects both the top rotary sensing coil TRSCi and the bottom rotary sensing coil BRSCi of that respective complementary pair. In some such implementations, N=4, and the at least N straight sides include 4 sides that are arranged parallel to the sides of a rectangular or square shape. It may be seen that the particular implementation of the stylus position detection portion 511' shown in FIG. 5 conforms to this description. However, it will be appreciated that various combinations of complementary pairs configurations and disruptor element edge configurations may be used, and the combination of the particular configurations shown in FIG. 5 is exemplary only and not limiting.

FIG. 6 is a partially schematic isometric diagram of certain elements of the stylus position detection portion 511' shown in FIG. 5, including schematically represented connections CONN to a block diagram of one exemplary implementation of signal processing and control circuitry 680. As shown in FIG. 6, the signal processing and control circuitry 680 is operably connected to the various coils of the stylus position detection portion 511'. In the implementation shown in FIG. 6, the signal processing and control circuitry 680 comprises a digital controller/processor 681, that may govern various timing and signal connection or exchange operations between its various interconnected components, which include a drive signal generator 682, an amplification/switching portion 683, a sample and hold portion 684, a multiplexing portion 685, and an A/D convertor portion 686. The digital controller/processor 681 may also perform various digital signal processing operations to determine the output signals APSOut and RPSOut, as previously outlined with reference to FIG. 2, and described further below. Portions of the design and operation of the signal processing and control circuitry 680 may generally be recognized and understood by one of ordinary skill in the art, according to known principles. For example, in one implementation, the certain elements of the signal processing and control circuitry 680 may be designed and operated by analogy to corresponding elements disclosed in U.S. Pat. No. 5,841,274, which is hereby incorporated herein by reference in its entirety.

In operation, the drive signal generator 682 is operated to provide a changing coil drive signal Dsig (e.g., a pulse) to the field generating coil configuration 560, which generates a changing magnetic flux generally along the axial direction in the disruptor motion volume MV in response to the coil drive signal. In the illustrated configuration, the top field generating coil 561T and the bottom field generating coil 561B are configured to provide changing magnetic fluxes that reinforce one another. The amplification/switching portion 683 is configured to input the signals RSIGs and ASIGs from the receiver coil portion 570, comprising respective signal components provided by the respective rotary and axial sensing coils located on the top and bottom coil substrates (e.g., the previously outlined signal components SIGTASCC, SIGBASCC, SIGTRSC1-SIGTRSC4, and SIGBRSC1-SIGBRSC4). In some implementations, the amplification/switching portion 683 may include switching circuits which may combine various analog signals to provide various desired sum or difference signals (e.g., by appropriate serial or parallel connections, or the like), for example as prescribed in the relationships shown in EQUATIONS 5-7, or the like. However, in other implementations, the amplification/switching portion 683 may perform only amplification and signal conditioning operations (e.g., and possibly signal inversion operations), with all signal combination operations performed in other circuit portions.

The sample and hold portion 684 inputs the various analog signals from the amplification/switching portion 683, and performs sample and hold operations according to known principles, e.g., to simultaneously sample and hold all respective signal components that arise from the various respective sensing coils of the receiver coil portion 570. In one implementation, the multiplexing portion 685 may connect various signals to the A/D convertor portion 686 sequentially, and/or in combinations related to various desired signal relationships (for example, as prescribed in the relationships shown in EQUATIONS 5-7, or the like). The A/D convertor portion 686 outputs corresponding digital signal values to the digital controller/processor 681.

The digital controller/processor 681 may then process and/or combine the digital signal values according to various desired relationships (for example, as prescribed in the relationships shown in EQUATIONS 5-7, or the like), to determine and output the output signals APSOut and RPSOut, which are indicative of the axial position and the rotary position of at least one of the disruptor element 551 or the stylus 506 relative to the frame or housing of the scanning probe. In some implementations the digital controller/processor 681 may be configured such that the output signals APSOut and RPSOut directly indicate the three-dimensional position of the stylus 506 or its probe tip 548 relative to the frame of the scanning probe. In other implementations, it may be configured to output signals that indirectly indicate the three-dimensional position of the stylus 506 or its probe tip 548 relative to the frame of the scanning probe, and a host system (e.g., a CMM) may input such signals and perform additional processing to further combine or refine such signals and determine the three-dimensional position of the stylus 506 or its probe tip 548 relative to the scanning probe and/or relative to an overall coordinate system used for CMM measurements.

Figure 7:
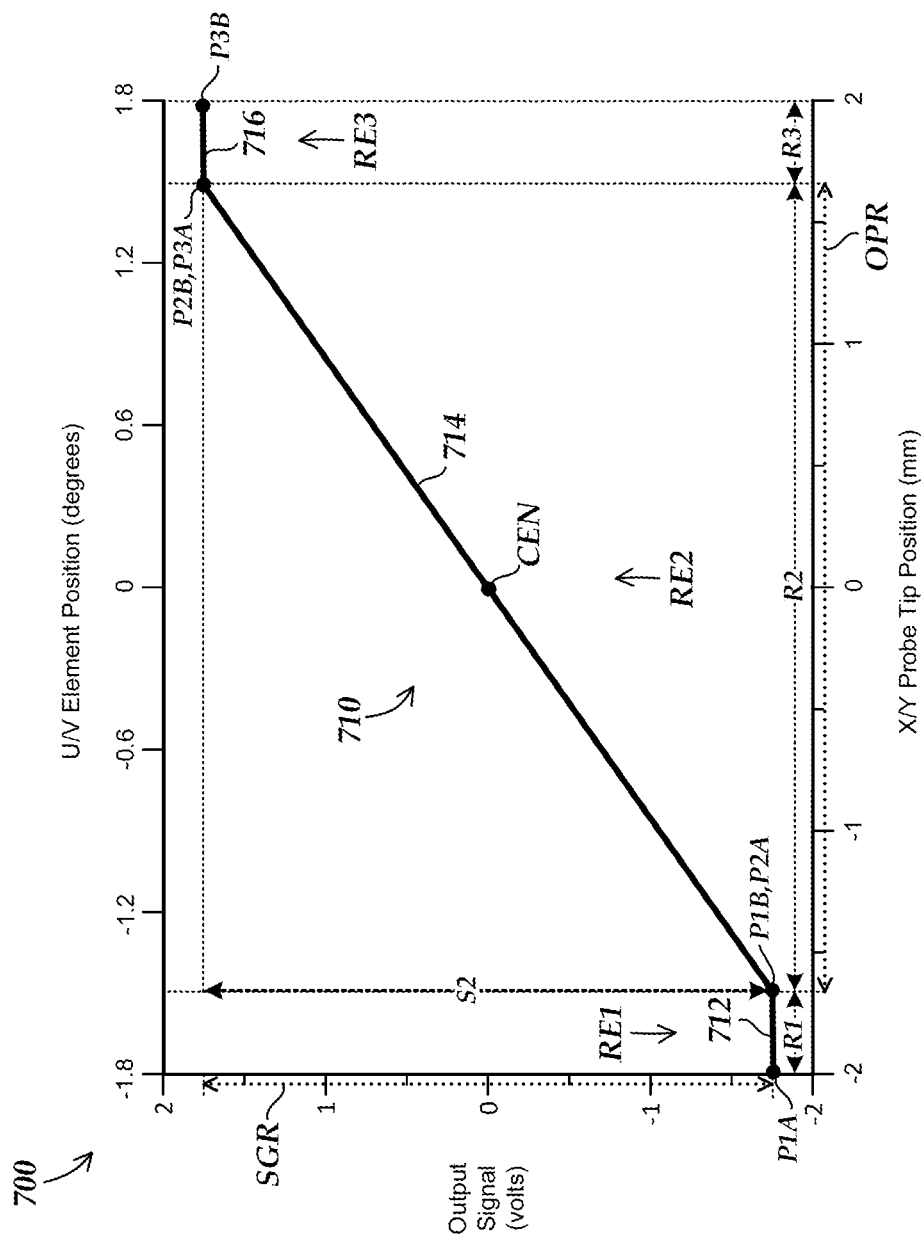
FIGS. 7-10 are diagrams of graphs illustrating examples of operating regions with different gain adjustments.

FIG. 7 is a diagram of a graph 700 including a signal curve 710 for an output signal level (i.e., as shown on the vertical axis, with a scale in volts with an illustrated range of −2 volts to +2 volts) versus an X/Y probe tip position (i.e., as shown on the horizontal axis at the bottom of the graph, with a scale in millimeters with an illustrated range of −2 mm to +2 mm). For example, in one implementation, the signal curve 710 may correspond to a Y probe tip position, such as described above with respect to the example of FIG. 3, and for which the signal level may correspond to the signals (e.g., the combined and/or processed signals) from the rotary sensing coils TRSC1, TRSC2, BRSC1 and BRSC2. In such an implementation, a similar second graph 700 may correspond to an X probe tip position, for which the signal level may correspond to the signals (e.g., the combined and/or processed signals) from the rotary sensing coils TRSC3, TRSC4, BRSC3 and BRSC4, such as those of the examples of FIGS. 5 and 6.

In FIG. 7, an indication of a corresponding UN element position (e.g., a disruptor element position as indicated in the examples of FIGS. 2-6) is also shown (i.e., as shown on the horizontal axis at the top of the graph, with a scale in degrees with an illustrated range of −1.8 degrees to +1.8 degrees). As illustrated, the signal curve 710 includes signal curve portions 712, 714 and 716, which correspond to respective operating regions RE1, RE2 and RE3. In a reference from left to right on the graph 700, the signal curve portion 712 extends from a starting point P1A to an ending point P1B, the signal curve portion 714 extends from a starting point P2A to an ending point P2B, and the signal curve portion 716 extends from a starting point P3A to an ending point P3B. In the example of FIG. 7, the ending point P1B and the starting point P2A are nominally the same, and the ending point P2B and the starting point P3A are nominally the same (e.g., indicating that the signal curve 710 is nominally continuous for the transitions between the signal curve portions 712, 714 and 716, and between the corresponding operating regions RE1, RE2 and RE3). In various implementations, the signal curve portion 712 extends over an operating range OPR and a signal range SGR (e.g., corresponding to an operating range and a signal range of the signal processing and control circuitry 680), which in various implementations may also or alternatively be referenced as an active operating range OPR and active signal range SGR.

Each of the points corresponds to a respective output signal level and an X/Y probe tip position (and U/V element position). In various implementations, the points may be referenced according to respective coordinate values on the graph 700. For example, point P2A may be referenced as being at coordinates ($PTP_{P2A}$, $SIG_{P2A}$) and point P2B may be referenced as being at coordinates ($PTP_{P2B}$, $SIG_{P2B}$), for respective probe tip positions PTP and output signal values SIG. As some specific numerical examples, as illustrated in FIG. 7, in one implementation $PTP_{P2A}$=−1.67 mm, $SIG_{P2A}$=−1.75 volts, $PTP_{P2B}$=1.67 mm, and $SIG_{P2B}$=1.75 volts. As an alternative or in addition to the probe tip positions PTP, references may also be made to the element positions EP, for which $EP_{P2A}$=−1.5 degrees and $EP_{P2B}$=1.5 degrees.

It is noted that the central operating region RE2, which may also or alternatively be referenced as central gain operating region RE2, extends over an X/Y probe tip position range R2 and has a corresponding signal range S2. In various implementations, the probe tip and signal ranges may also be referenced as corresponding to differences between the starting and ending points P2A and P2B of the corresponding signal curve portion 714 (e.g., $R2=PTP_{P2B}-PTP_{P2A}$ and $S2=SIG_{P2B}-SIG_{P2A}$). In various implementations, a gain for a signal curve portion and/or corresponding operating region may correspond to (e.g., be defined as) a ratio of an amount of output change (e.g., output signal change, such as corresponding to a magnitude of a signal range for the operating region) to an amount of input change (e.g., probe tip position change or element position change, such as corresponding to a probe tip position range and/or element position range for the operating region). In such an implementation, where a gain GN2 corresponds to the gain in the operating region RE2, then gain $GN2=S2/R2=(SIG_{P2B}-SIG_{P2A})/(PTP_{P2B}-PTP_{P2A})=3.5$ volts/3.33 mm=1.05 volts/mm (i.e., in accordance with the above noted example numerical values, where PTP is in reference to the probe tip position). In addition, gain $GN2=S2/R2=(SIG_{P2B}-SIG_{P2A})/(EP_{P2B}-EP_{P2A})=3.5$ volts/3.0 degrees=1.167 volts/degree (i.e., in accordance with the above noted example numerical values, where EP is in reference to the element position). In various implementations, a center point CEN of the central operating region RE2 and the corresponding signal portion 714 (e.g., which may also correspond to a center point of the signal curve 710) may have coordinates corresponding to $SIG_{CEN}=0$ volts, $PTP_{CEN}=0$ mm, $EP_{CEN}=0$ degrees. In the example of FIG. 7, the range R2 may also correspond to an operating range OPR, and the corresponding signal range S2 may correspond to a signal range SGR.

Figure 9:
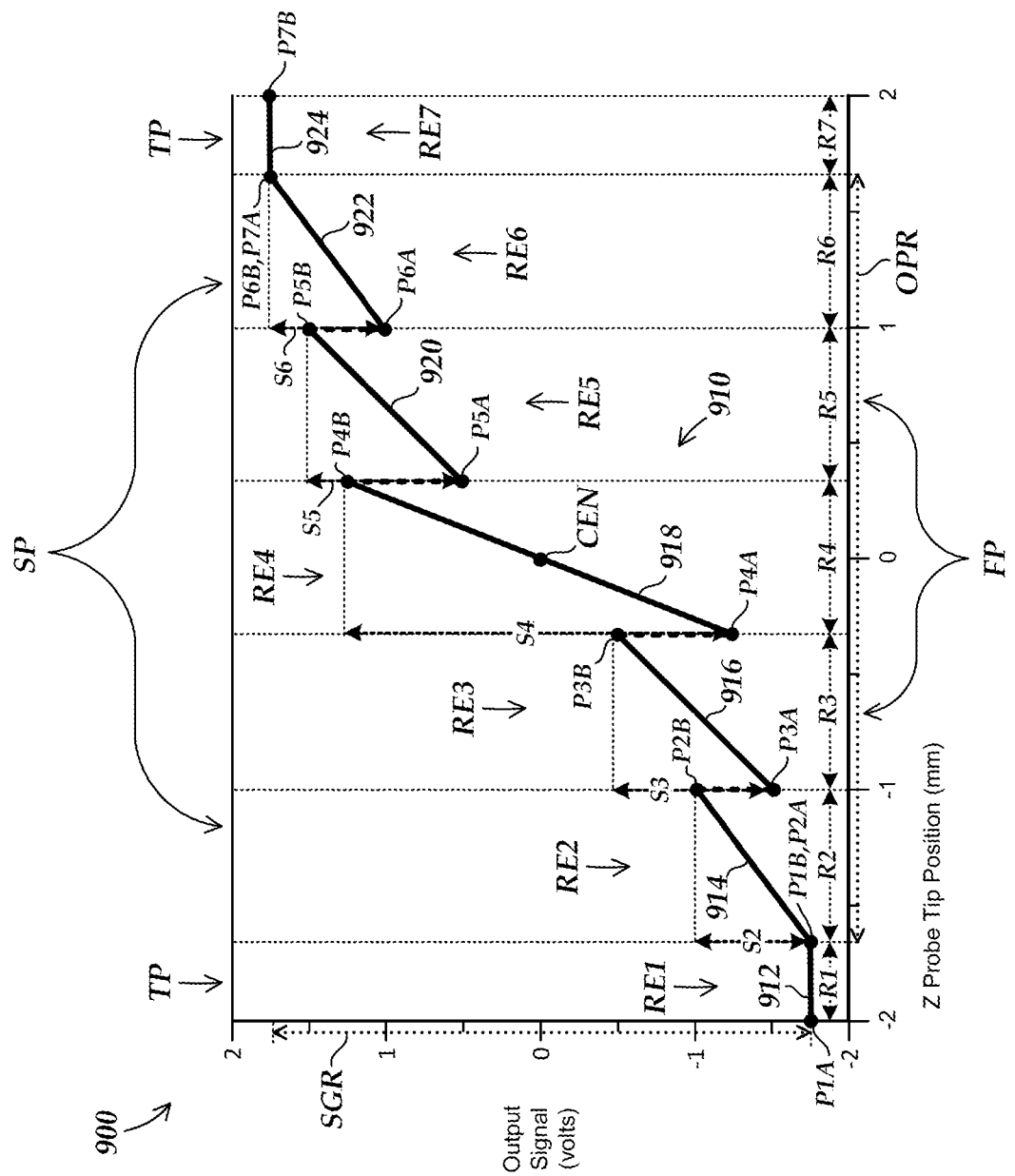
Figure 10:
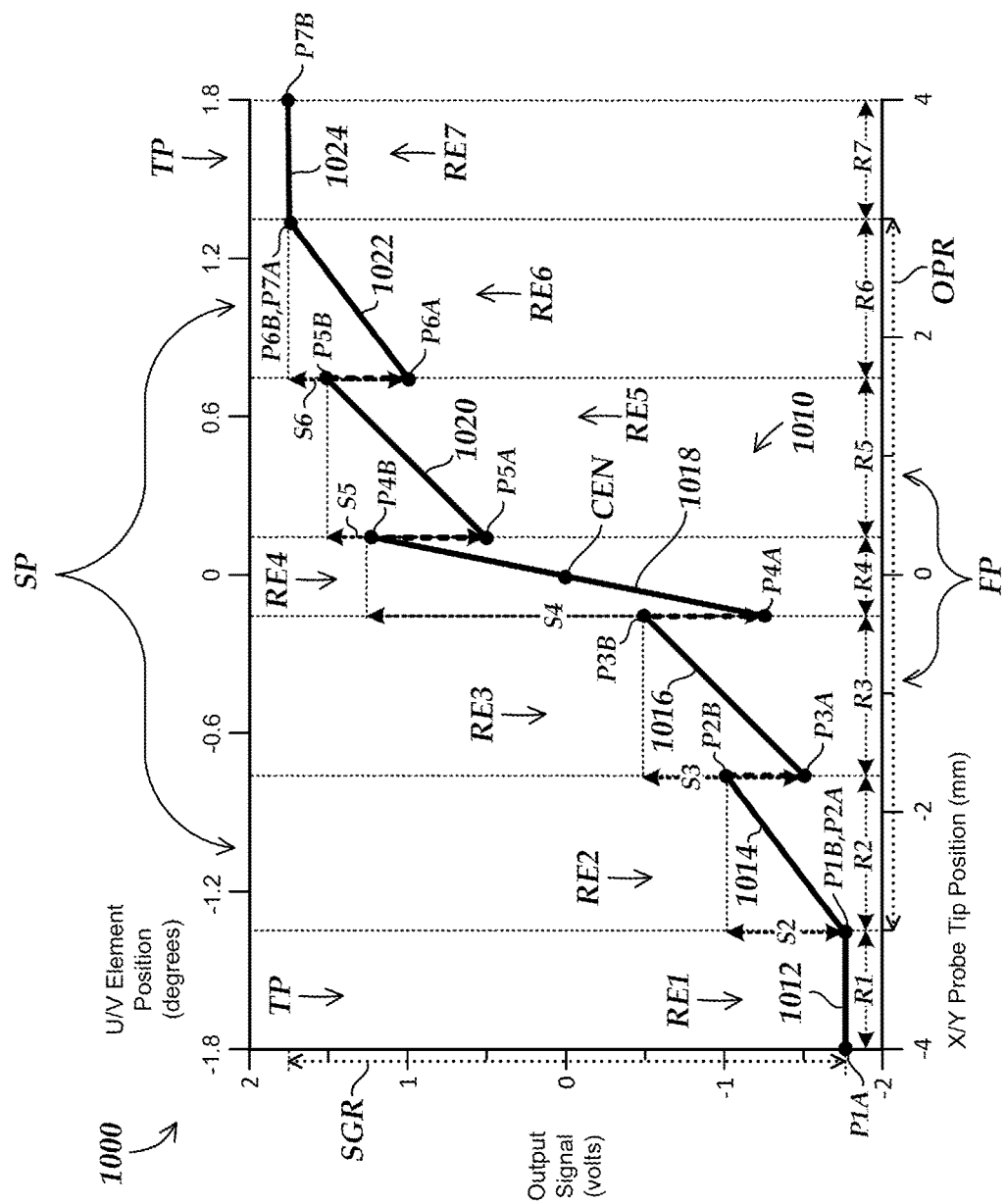

In contrast to the central gain operating region RE2 (i.e., which has a gain GN2 which is non-zero), the operating regions RE1 and RE3 may be referenced as saturation operating regions RE1 and RE3 corresponding to a saturation state (e.g., of the amplification portion 683 of FIG. 6) and are correspondingly indicated as having no gain (i.e., and are correspondingly referenced herein as saturation regions and not gain regions). More specifically, the corresponding signal curve portions 712 and 716 are indicated as being nominally flat, for which no gain is indicated, and further change of the X/Y probe tip position when operating in these saturation operating regions does not result in any notable increase or decrease of the output signal level. Similar saturation operating regions are illustrated in FIGS. 8-10 (as will be described in more detail below), and will be understood to have similar characteristics.

In the configuration of FIG. 7, the probe is noted to have a fixed gain and for which the output signal (i.e., corresponding to the sensor configuration output) is linear over the full probe range until saturation is reached (e.g., as illustrated by the signal curve portion 714 in relation to the signal curve portions 712 and 716). In various implementations, such a configuration may be characterized as achieving the total mechanical range at the cost of resolution. In accordance with principles disclosed herein, it is noted that while the full measurement range may be utilized as illustrated in the example of FIG. 7, a true useful measurement range (e.g., corresponding to a primarily utilized measurement range) may be much lower. As will be described in more detail below with respect to FIGS. 8-10, by using a higher gain in a primarily utilized measurement range (e.g., as corresponding to a central high gain operating region), a higher resolution and better noise performance may be achieved. It is noted that if the higher gain were continued to be used for measurements outside the primarily utilized measurement range, this would cause the sensor configuration output to saturate before reaching the edge of the mechanical range (e.g., as will be understood in reference to the configurations of FIGS. 3-6 as described above). In accordance with principles disclosed herein, by changing the gain based on the measured position, a higher accuracy may be achieved in the primarily utilized measurement range, while avoiding saturation over the full range. More specifically, as will be described in more detail below with respect to the examples of FIGS. 8-10, as the output signal of the sensor configuration approaches saturation, the gain may be lowered to bring the output signal back to a desired level. In various implementations, such processes may be repeated at set intervals until a maximum range or a minimum desired gain is reached. As will further be described below in relation to a comparison between the examples of FIGS. 8 and 10, gain bands (i.e., corresponding to operating regions) can also be programmed/determined based on stylus length to maximize signal across the region of interest and prevent saturation over the full mechanical range.

Figure 8:
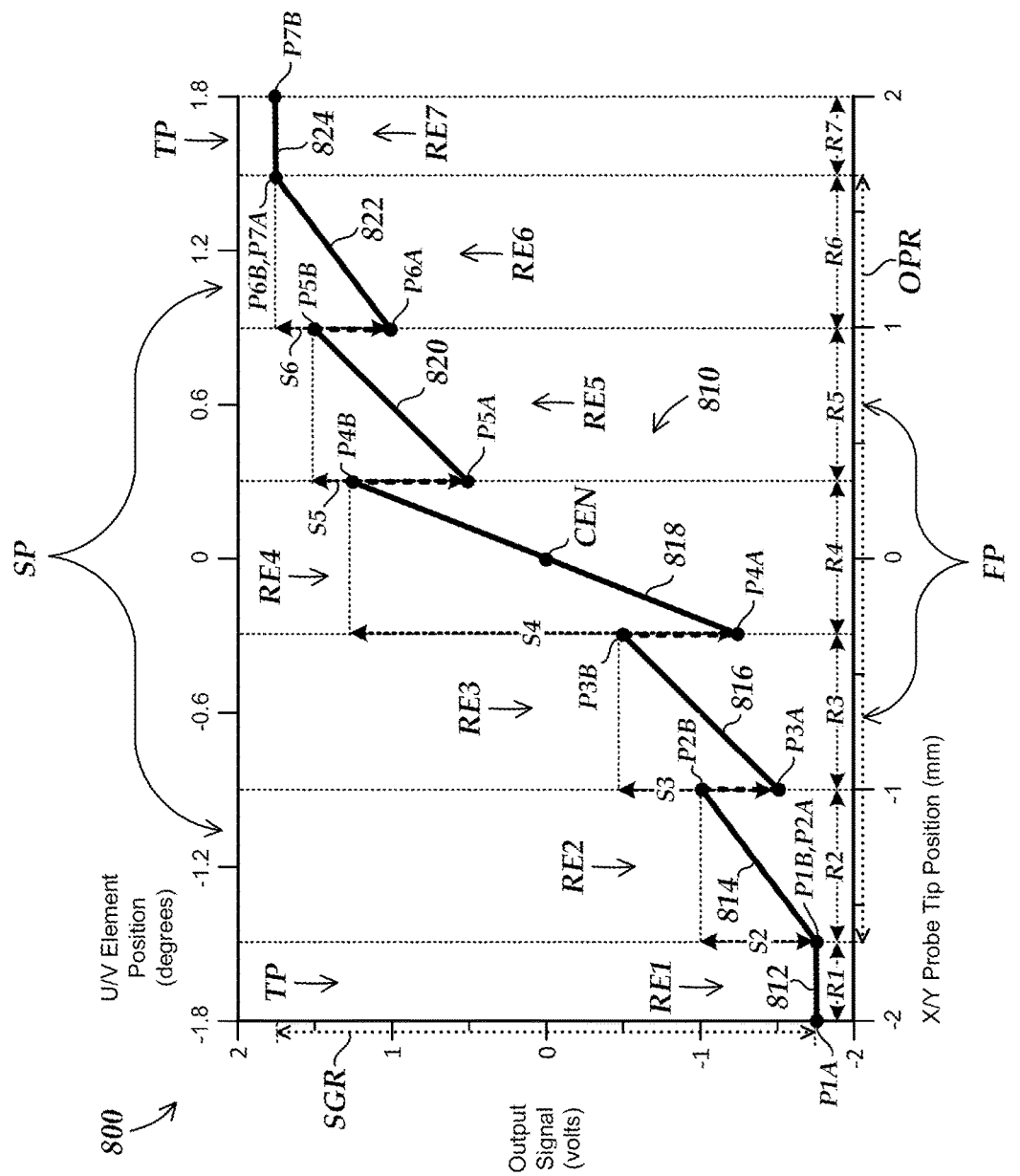

FIG. 8 is a diagram of a graph 800 including a signal curve 810 for an output signal level (i.e., in volts) versus an X/Y probe tip position (i.e., in millimeters), and also versus a UN element position (i.e., in degrees), each indicated on scales similar to those of FIG. 7. In various implementations, the ranges illustrated in FIG. 8 are configured to be utilized with a stylus (e.g., stylus 406/506) of a particular length (e.g., a length of 20 mm in the present example). As illustrated and described above with respect to FIGS. 3-6, an element (e.g., a disruptor element 451/551) may have certain maximum movement ranges (e.g., within a position detection configuration), and which may correspond to certain maximum movement ranges of a probe tip (e.g., probe tip 448/548), in accordance with the length of the stylus (e.g., in relation to a rotation center RC and in accordance with calculations such as those of EQUATIONS 1-3, etc.). As will be described in more detail below with respect to FIG. 10, in various implementations different ranges may be configured to be utilized with styluses of different lengths.

As illustrated, the signal curve 810 includes signal curve portions 812, 814, 816, 818, 820, 822, and 824, which correspond to respective operating regions RE1, RE2, RE3, RE4, RE5, RE6 and RE7. In a reference from left to right on the graph 800, each of the signal curve portions extends from a corresponding starting point to a corresponding ending point (e.g., similar to FIG. 7). More specifically, the signal curve portion 812 extends from point P1A to point P1B, the signal curve portion 814 extends from point P2A to point P2B, the signal curve portion 816 extends from point P3A to point P3B, the signal curve portion 818 extends from point P4A to point P4B, the signal curve portion 820 extends from point P5A to point P5B, the signal curve portion 822 extends from point P6A to point P6B and the signal curve portion 824 extends from point P7A to point P7B. As will be described in more detail below, the slopes of the signal curve portions 812, 814, 816, 818, 820, 822, and 824 indicate the gain in each of the corresponding operating regions RE1, RE2, RE3, RE4, RE5, RE6 and RE7.

In the example of FIG. 8, the ending point P2B and the starting point P3A are not the same, the ending point P3B and the starting point P4A are not the same, the ending point P4B and the starting point P5A are not the same, and the ending point P5B and the starting point P6A are not the same. These differences indicate a change (e.g., a discontinuous or rapid signal transition) in signal level for the transitions between the signal curve portions 814, 816, 818, 820 and 822 and corresponding operating regions RE2, RE3, RE4, RE5 and RE6. Similar to the description above with respect to FIG. 7, each of the points corresponds to a respective output signal level and an X/Y probe tip position (and U/V element position), and may be referenced according to respective coordinate values on the graph 800.

It is noted that in the example of FIG. 8, the operating region RE4, which may be referenced as the central high gain operating region RE4, extends over and corresponds to an X/Y probe tip position range R4, which may be referenced as a central high gain probe tip position range R4, and has a corresponding signal range S4. In various implementations, the probe tip and signal ranges may also be referenced as corresponding to differences between the starting and ending points P4A and P4B of the corresponding signal curve portion 818 (e.g., R4=$PTP_{P4B}$−$PT_{P4A}$ and S4=$SIG_{P4B}$−$SIG_{P4A}$). In accordance with the definitions described above, the corresponding gain GN4=S4/R4=|($SIG_{P4B}$−$SIG_{P4A}$)|/($PTP_{P4B}$−$PT_{P4A}$)=2.66 volts/0.667 mm=4.0 volts/mm (i.e., in accordance with the example values indicated in the graph 800 and as indicated by the corresponding slope of the signal curve portion 818).

In various implementations, the ranges R1-R7 of the operating regions RE1-RE7 may also or alternatively be referenced as element position ranges R1-R7 (e.g., in relation to the corresponding angular UN element positions, such as disruptor element positions as indicated in the examples of FIGS. 2-6). Similar to the above description for the example of the operating region RE4, the element position and signal ranges may also be referenced as corresponding to differences between the starting and ending points P4A and P4B of the corresponding signal curve portion 818 (e.g., R4=$EP_{P4B}$−$EP_{P4A}$ and S4=$SIG_{P4B}$−$SIG_{P4A}$), where EP signifies element position. Similar to the example for the probe tip positions described above, for the element positions the corresponding gain GN4=S4/R4=|($SIG_{P4B}$−$SIG_{P4A}$)|/($EP_{P4B}$−$EP_{P4A}$)=2.66 volts/0.6 degrees=4.44 volts/degree (i.e., in accordance with the example values indicated in the graph 800 and as indicated by the corresponding slope of the signal curve portion 818). The range R4 may also or alternatively be referenced as a central high gain element position range R4. In various implementations, a center point CEN of the central operating region RE4 and the corresponding signal portion 818 (e.g., which may also correspond to a center point of the signal curve 810) may have coordinates corresponding to $SIG_{CEN}$=0 volts, $PTP_{CEN}$=0 mm, $EP_{CEN}$=0 degrees. In various implementations, when a center point CEN does not have one or more values corresponding to 0, a zeroing operation may be performed, as will be described in more detail below.

In various implementations, the operating regions RE3 and RE5 may be referenced as a first pair of lower gain operating regions FP, and for which the central high gain operating region RE4 is between the operating regions RE3 and RE5 of the first pair of lower gain operating regions FP. As illustrated in FIG. 8, each of the lower gain operating regions RE3 and RE5 of the first pair of lower gain operating regions FP is adjacent to a respective side of the central high gain operating region RE4. More specifically, the operating region RE3 is adjacent to the left side of the central high gain operating region RE4, and the operating region RE5 is adjacent to the right side of the central high gain operating region RE4. In various implementations, it may also or alternatively be stated that the central high gain operating region RE4 is bordered by the first pair of lower gain operating regions FP. In various implementations, it may also or alternatively be stated that the operating region RE3 is a first negative relative position operating region and the operating region RE5 is a first positive relative position operating region of the first pair of lower gain operating regions FP (e.g., for which the relative negative and positive positions may be in reference/relation to a null or zero position at or near a middle of the central high gain operating region RE4, such as indicated by the XY probe tip position of 0 in the graph 800 and/or as corresponding to the center point CEN). In various implementations, each of the lower gain operating regions RE3 and RE5 of the first pair of lower gain operating regions FP may have a corresponding gain (e.g., gain GN3 and GN5) that is less than the gain (e.g., gain GN4) of the central high gain operating region RE4.

More specifically, as indicated in FIG. 8, the operating region RE3 extends over and corresponds to an X/Y probe tip position range R3, which may be referenced as a lower gain probe tip position range R3, and has a corresponding signal range S3. As noted above, the probe tip and signal ranges may also be referenced as corresponding to differences between the starting and ending points P3A and P3B of the corresponding signal curve portion 816 (e.g., R3=$PTP_{P3B}$−$PTP_{P3A}$ and S3=$SIG_{P3B}$−$SIG_{P3A}$). In accordance with the definitions described above, the corresponding gain GN3=S3/R3=|($SIG_{P3B}$−$SIG_{P3A}$)|/($PTP_{P3B}$−$PTP_{P3A}$)=1.00 volts/0.667 mm=1.5 volts/mm (i.e., in accordance with the example values indicated in the graph 800 and as indicated by the corresponding slope of the signal curve portion 816). In addition, in relation to the element position calculations described above, gain GN3=S3/R3=|($SIG_{P3B}$−$SIG_{P3A}$)|/($EP_{P3B}$−$EP_{P3A}$)=1.00 volts/0.6 degrees=1.67 volts/degree (i.e., in accordance with the example values indicated in the graph 800 and as indicated by the corresponding slope of the signal curve portion 816).

As further indicated in FIG. 8, the operating region RE5 extends over and corresponds to an X/Y probe tip position range R5, which may be referenced as a lower gain probe tip position range R5, and has a corresponding signal range S5. As noted above, the probe tip and signal ranges may also be referenced as corresponding to differences between the starting and ending points P5A and P5B of the corresponding signal curve portion 820 (e.g., R5=$PTP_{P5B}$−$PTP_{P5A}$ and S5=$SIG_{P5B}$−$SIG_{P5A}$). In accordance with the definitions described above, the corresponding gain GN5=S5/R5=|($SIG_{P5B}$−$SIG_{P5A}$)|/($PTP_{P5B}$−$PTP_{P5A}$)=1.00 volts/0.667 mm=1.5 volts/mm (i.e., in accordance with the example values indicated in the graph 800 and as indicated by the corresponding slope of the signal curve portion 820). In addition, in relation to the element position calculations described above, gain GN5=S5/R5=|($SIG_{P5B}$−$SIG_{P5A}$)|/($EP_{P5B}$−$EP_{P5A}$)=1.00 volts/0.6 degrees=1.67 volts/degree (i.e., in accordance with the example values indicated in the graph 800 and as indicated by the corresponding slope of the signal curve portion 820).

Thus, in these examples, the gain GN4 of the central high gain operating region is greater than the gains GN3 and GN5 of each of the lower gain operating regions RE3 and RE5 of the first pair of lower gain operating regions FP (i.e., GN4=4.0 volts/mm and 4.44 volts/degree, which is greater than GN3=GN5=1.5 volts/mm and 1.67 volts/degree). These relationships are also noted to be indicated by the slope of the signal curve portion 818 as compared to the slopes of the signal curve portions 816 and 820. The slopes and positions of the signal curve portions 816 and 820 are also noted to illustrate a desirable symmetrical and balanced configuration (e.g., with equal position ranges R3 and R5 and equal signal ranges S3 and S5, and equal distances from the center and edges of the graph 800 and within the operating range OPR, and for which the signal curve portions 816 and 820 are collinear, etc.). It will be appreciated that while such characteristics may be desirable in some implementations, certain alternative implementations may include configurations with different characteristics (e.g., such alternative configurations may not be symmetrical, etc.)

In various implementations, the operating regions RE2 and RE6 may be referenced as a second pair of lower gain operating regions SP, and for which the operating regions RE3 and RE5 of the first pair of lower gain operating regions FP are between the operating regions RE2 and RE6 of the second pair of lower gain operating regions SP. As illustrated in FIG. 8, each of the lower gain operating regions RE2 and RE6 of the second pair of lower gain operating regions SP is adjacent to a respective outer side of an operating region RE3 or RE5 of the first pair of lower gain operating regions FP. More specifically, the operating region RE2 of the second pair of lower gain operating regions SP is adjacent to the left side of the operating region RE3 of the first pair of lower gain operating regions FP, and the operating region RE6 of the second pair of lower gain operating regions SP is adjacent to the right side of the operating region RE5 of the first pair of lower gain operating regions FP. In various implementations, it may also or alternatively be stated that the first pair of lower gain operating regions FP is bordered by the second pair of lower gain operating regions SP. In various implementations, it may also or alternatively be stated that the operating region RE2 is a second negative relative position operating region and the operating region RE6 is a second positive relative position operating region of the second pair of lower gain operating regions SP (e.g., for which the relative negative and positive positions may be in reference/relation to a null or zero position at or near a middle/center of the central high gain operating region RE4, such as indicated by the XY probe tip position of 0 in the graph 800 and/or as corresponding to the center point CEN). In various implementations, each of the operating regions RE2 and RE6 of the second pair of lower gain operating regions SP may have a corresponding gain (e.g., gain GN2 and GN6) that is less than a corresponding gain (e.g., gain GN3 and GN5) of the operating regions RE3 and RE5 of the first pair of lower gain operating regions FP.

More specifically, as indicated in FIG. 8, the operating region RE2 extends over and corresponds to an X/Y probe tip position range R2, which may be referenced as a lower gain probe tip position range R2, and has a corresponding signal range S2. As noted above, the probe tip and signal ranges may also be referenced as corresponding to differences between the starting and ending points P2A and P2B of the corresponding signal curve portion 816 (e.g., $R2=PTP_{P2B}-PTP_{P2A}$ and $S2=SIG_{P2B}-SIG_{P2A}$). In accordance with the definitions described above, the corresponding gain $GN2=S2/R2=|(SIG_{P2B}-SIG_{P2A})|/(PTP_{P2B}-PTP_{P2A})=0.75$ volts/0.667 mm=1.125 volts/mm (i.e., in accordance with the example values indicated in the graph 800 and as indicated by the corresponding slope of the signal curve portion 814). In addition, in relation to the element position calculations described above, gain $GN2=S2/R2=|(SIG_{P2B}-SIG_{P2A})|/(EP_{P2B}-EP_{P2A})=0.75$ volts/0.6 degrees=1.25 volts/degrees (i.e., in accordance with the example values indicated in the graph 800 and as indicated by the corresponding slope of the signal curve portion 814).

As further indicated in FIG. 8, the operating region RE6 extends over and corresponds to an X/Y probe tip position range R6, which may be referenced as a lower gain probe tip position range R6, and has a corresponding signal range S6. As noted above, the probe tip and signal ranges may also be referenced as corresponding to differences between the starting and ending points P6A and P6B of the corresponding signal curve portion 820 (e.g., $R6=PTP_{P6B}-PTP_{P6A}$ and $S6=SIG_{P6B}-SIG_{P6A}$). In accordance with the definitions described above, the corresponding gain $GN6=S6/R6=|(SIG_{P6B}-SIG_{P6A})|/(PTP_{P6B}-PTP_{P6A})=0.75$ volts/0.667 mm=1.125 volts/mm (i.e., in accordance with the example values indicated in the graph 800 and as indicated by the corresponding slope of the signal curve portion 822). In addition, in relation to the element position calculations described above, gain $GN6=S6/R6=|(SIG_{P6B}-SIG_{P6A})|/(EP_{P6B}-EP_{P6A})=0.75$ volts/0.6 degrees=1.25 volts/degree (i.e., in accordance with the example values indicated in the graph 800 and as indicated by the corresponding slope of the signal curve portion 822).

Thus, in these examples, the gains GN3 and GN5 of the first pair of lower gain operating regions FP are greater than the gains GN2 and GN6 of the second pair of lower gain operating regions SP (i.e., GN3=GN5=1.5 volts/mm and 1.67 volts/degree, which is greater than GN2=GN6=1.125 volts/mm and 1.25 volts/degree). These relationships are also noted to be indicated by the slopes of the signal curve portions 816 and 820 as compared to the slopes of the signal curve portions 814 and 822. The slopes and positions of the signal curve portions 814 and 822 are also noted to illustrate a desirable symmetrical and balanced configuration (e.g., with equal probe tip position ranges R2 and R6 and equal signal ranges S2 and S6, and equal distances from the center and edges of the graph 800 within the operating range OPR, etc.)

In various implementations, the operating regions RE1 and RE7 may be referenced as a pair of saturation operating regions TP (e.g., or a third pair of operating regions TP), and for which the operating regions RE2 and RE6 of the second pair of lower gain operating regions SP are between the operating regions RE1 and RE7 of the pair of saturation operating regions TP. As illustrated in FIG. 8, each of the operating regions RE1 and RE7 of the pair of saturation operating regions TP is adjacent to a respective outer side of an operating region RE4 or RE6 of the second pair of lower gain operating regions FP. More specifically, the operating region RE1 of the pair of saturation operating regions TP is adjacent to the left side of the operating region RE2 of the second pair of lower gain operating regions SP, and the operating region RE7 of the pair of saturation operating regions TP is adjacent to the right side of the operating region RE6 of the second pair of lower gain operating regions SP. In various implementations, it may also or alternatively be stated that the second pair of lower gain operating regions SP is bordered by the pair of saturation operating regions TP. In various implementations, it may also or alternatively be stated that the operating region RE1 is a third negative relative position operating region and the operating region RE7 is a third positive relative position operating region of the pair of saturation operating regions TP (e.g., for which the relative negative and positive positions may be in reference/relation to a null or zero position at or near a middle/center of the central high gain operating region RE4, such as indicated by the XY probe tip position of 0 in the graph 800 and/or as corresponding to the center point CEN).

It is noted that the operating regions RE1 and RE7 of the pair of saturation operating regions TP correspond to respective saturation probe tip position ranges R1 and R7 (e.g., for which R1 may be equal to R7) and which are at the edges of the graph 800 (e.g., as corresponding to the edges of the operating range OPR of the signal processing and control circuitry). As noted above, the pair of saturation operating regions TP corresponds to a saturation state in which no output signal change results from probe tip position change and for which there is no corresponding gain. More specifically, the corresponding signal curve portions 812 and 824 are indicated as being nominally flat, for which no gain is indicated, and further change of the X/Y probe tip position when operating in these saturation operating regions does not result in any increase or decrease of the output signal level.

In various implementations, the gain signal curve portions 814, 816, 818, 820 and 822 of the signal curve 810 (i.e., between the saturation signal curve portions 812 and 824) extend over an operating range OPR and a signal range SGR (e.g., corresponding to an operating range and a signal range of the signal processing and control circuitry 680), which in various implementations may also or alternatively be referenced as an active operating range OPR and active signal range SGR. In the example of FIG. 8, SGR=$SIG_{P6B}$−$SIG_{P2A}$=3.75 volts, $OPR_{PTP}$=$PTP_{P6B}$−$PTP_{P2A}$=3.33 mm and $OPR_{EP}$=$EP_{P6B}$−$EP_{P2A}$=3 degrees. In various implementations, the full ranges of the signal curve 810 (i.e., including the saturation signal curve portions 812 and 824) may correspond to the full mechanical range (e.g., of the sensing configuration of the probe), which as illustrated may correspond to $PTP_{P7B}$−$PTP_{P1A}$=4.0 mm and $EP_{P7B}$−$EP_{P1A}$=3.6 degrees.

In various implementations, in order to achieve the transitions between the operating regions RE1-RE7 of FIG. 8, as well as in the configurations of FIGS. 9 and 10 as will be described in more detail below, transition operations may be performed (e.g., to adjust the gain to correspond to that of the operating region that is being transitioned to). In one implementation, a transition operation may include adjusting a power of the field generating coil configuration (e.g., field generating coil configuration 560), so as to adjust the ratio of the magnitude of output signal change to probe tip position change so as to correspond to the specified gain of the operating region that is being transitioned to. In various implementations, the power may be adjusted by adjusting the coil drive signal (e.g., from the drive signal generator 682). It will be appreciated that such techniques may achieve a large signal change (e.g., a large signal increase with little or no corresponding noise increase), and may be implemented without requiring new components to be added to existing probe configurations, etc.

In another implementation, a transition operation may include adjusting a gain of one or more variable gain amplifiers, so as to adjust the ratio of the magnitude of output signal change to probe tip position change so as to correspond to the specified gain of the operating region that is being transitioned to. For example, in various implementations the amplification portion 683 may include one or more variable gain amplifiers configured to amplify signals from coils of the stylus position detection portion, which may correspondingly be adjusted. It will be appreciated that such techniques may have negligible effect on power, and may be implemented without requiring new components to be added to existing probe configurations, etc.

In another implementation, a transition operation may include altering a characteristic of one or more of the sensing coils (e.g., rotary sensing coils) so as to adjust the ratio of the magnitude of output signal change to probe tip position change so as to correspond to the specified gain of the operating region that is being transitioned to. For example, in various implementations, a relay or other form of switch may be utilized to add or remove turns from the coils (e.g., to effectively change the size of the coils), or otherwise change the characteristics of the sensing coils to achieve the specified gain change. It will be appreciated that such techniques may have negligible effect on power, and may enable the sensor configuration to be optimized for each new gain step/transition.

In another implementation, the transition operation may include altering an input range of an analog to digital converter so as to adjust the ratio of the magnitude of output signal change to probe tip position change so as to correspond to the specified gain of the operating region that is being transitioned to. For example, in various implementations the A/D converter portion 686 may include one or more analog to digital converters, or a single analog to digital converter with a variable range, configured to convert analog signals from coils of the stylus position detection portion to digital signals, and for which the input range may be altered. Such alterations may enable smaller ranges to be used for the main measurement envelope so as to increase resolution. It will be appreciated that such techniques may have negligible effect on power.

FIG. 9 is a diagram of a graph 900 including a signal curve 910 for an output signal level (i.e., in volts) versus a Z probe tip position (i.e., in millimeters). In the example of FIG. 9, the graph 900 is substantially similar to the graph 800, and will be understood to have similar characteristics and similar operations, and will be understood from the above description of the corresponding features of the graph 800. A primary difference from the graph 800 which is in reference to X/Y probe tip positions (e.g., as in relation to rotary movements and rotary sensing coils, etc., as described above with respect to FIGS. 2-6), is that the graph 900 is in relation to Z probe tip positions (e.g., as in relation to axial movements and axial sensing coil configurations, etc., as described above with respect to FIGS. 2-6). The graph 900 also correspondingly does not include a scale for angular UN element position (i.e., which relates to rotary motion). As will be described in more detail below with respect to FIG. 10, when a stylus of a different length is utilized, alternative operating characteristics may be utilized for the X/Y probe tip position measurements (e.g., due to the different stylus length resulting in a different amount of corresponding movement of the UN element position, such as the movement of the disruptor element 551, for a given amount of probe tip movement). In contrast, for Z probe tip position measurements (e.g., for which the length of the stylus may typically not be a significant factor), the same operating characteristics may be utilized for styluses of any length with respect to the Z motion, and for which in various implementations the graph 900 may therefore be representative of such operating characteristics for Z probe tip position measurements for styluses of any length.

As illustrated in FIG. 9, the signal curve 910 includes signal curve portions 912, 914, 916, 918, 920, 922, and 924 (e.g., which appear identical and indicate identical operations to the signal curve portions 812, 814, 816, 818, 820, 822, and 824 of FIG. 8), and which correspond to respective operating regions RE1, RE2, RE3, RE4, RE5, RE6 and RE7. Briefly, similar to FIG. 8, for the signal curve portion 918, the central high gain operating region RE4 corresponds to a central high gain probe tip position range R4. The signal curve portions 916 and 920 correspond to the first pair of lower gain operating regions FP, which correspond to respective lower gain probe tip position ranges R3 and R5. The central high gain operating region RE4 is between the operating regions RE3 and RE5 of the first pair of lower gain operating regions FP. The first pair of lower gain operating regions FP has lower respective gains GN3 and GN5 than the gain GN4 of the central high gain operating region RE4 (e.g., as indicated by the slopes of the respective signal curve portions 916 and 920 as compared to 918), for which the gains and other values are identical to those described above with respect to FIG. 8 (e.g., for which GN4=4.0 volts/mm, which is greater than GN3=GN5=1.5 volts/mm).

The signal curve portions 914 and 922 correspond to the second pair of lower gain operating regions SP, which correspond to respective lower gain probe tip position ranges R2 and R6. The operating regions RE3 and RE5 of the first pair of lower gain operating regions FP are between the operating regions RE2 and RE6 of the second pair of lower gain operating regions SP. The second pair of lower gain operating regions SP has lower respective gains GN2 and GN6 than the gains GN3 and GN5 of the first pair of lower gain operating regions FP (e.g., as indicated by the slopes of the respective signal curve portions 914 and 922 as compared to 916 and 920), for which the gains and other values are identical to those described above with respect to FIG. 8 (e.g., for which GN3=GN5=1.5 volts/mm, which is greater than GN2=GN6=1.125 volts/mm). The signal curve portions 912 and 924 correspond to the pair of saturation operating regions TP, which correspond to respective saturation probe tip position ranges and which are at the edges of the operating range OPR of the signal processing and control circuitry. The second pair of lower gain operating regions SP is between the pair of saturation operating regions TP, and the pair of saturation operating regions TP corresponds to a saturation state in which no output signal change results from probe tip position change and for which there is no corresponding gain.

FIG. 10 is a diagram of a graph 1000 including a signal curve 1010 for an output signal level (i.e., in volts) versus an X/Y probe tip position (i.e., in millimeters), and also versus a UN element position (i.e., in degrees). In various implementations, the ranges illustrated in FIG. 10 are configured to be utilized with a stylus (e.g., stylus 406/506) of a particular length (e.g., a length of 100 mm in the present example). As illustrated and described above with respect to FIGS. 3-6, an element (e.g., a disruptor element 451/551) may have certain maximum movement ranges (e.g., within a position detection configuration), and which may correspond to certain maximum movement ranges of a probe tip (e.g., probe tip 448/548), in accordance with the length of the stylus (e.g., in relation to a rotation center RC and in accordance with calculations such as those of EQUATIONS 1-3, etc.). In the example of FIG. 10, other than certain differences related to certain different ranges that will be described in more detail below, the graph 1000 otherwise includes certain characteristics similar to those of the graph 800, and will be understood to have certain similar operations as will be understood from the above description of the corresponding features of the graph 800.

As illustrated in FIG. 10, the signal curve 1010 includes signal curve portions 1012, 1014, 1016, 1018, 1020, 1022, and 1024 (e.g., which have certain different ranges but otherwise operate similarly to the signal curve portions 812, 814, 816, 818, 820, 822, and 824 of FIG. 8), and which correspond to respective operating regions RE1, RE2, RE3, RE4, RE5, RE6 and RE7. Similar to FIG. 8, for the signal curve portion 1018 of FIG. 10, the central high gain operating region RE4 corresponds to a central high gain probe tip position range R4. The gain GN4=S4/R4=|(SIG$_{P4B}$−SIG$_{P4A}$)|/(PTP$_{P4B}$−PTP$_{P4A}$)=2.66 volts/0.667 mm=4.0 volts/mm (i.e., in accordance with the example values indicated in the graph 1000 and as indicated by the corresponding slope of the signal curve portion 1018). In addition, in relation to the element position, the gain GN4=S4/R4=|(SIG$_{P4B}$−SIG$_{P4A}$)|/(EP$_{P4B}$−EP$_{P4A}$)=2.66 volts/0.3 degrees=8.88 volts/degree (i.e., in accordance with the example values indicated in the graph 1000 and as indicated by the corresponding slope of the signal curve portion 1018). The range R4 may also or alternatively be referenced as a central high gain element position range R4. In various implementations, a center point CEN of the central operating region RE4 and the corresponding signal portion 1018 (e.g., which may also correspond to a center point of the signal curve 1010) may have coordinates corresponding to SIG$_{CEN}$=0 volts, PTP$_{CEN}$=0 mm, EP$_{CEN}$=0 degrees. In various implementations, when a center point CEN does not have one or more values corresponding to 0, a zeroing operation may be performed, as will be described in more detail below.

The signal curve portions 1016 and 1020 correspond to the first pair of lower gain operating regions FP, which correspond to respective lower gain probe tip position ranges R3 and R5. The central high gain operating region RE4 is between the operating regions RE3 and RE5 of the first pair of lower gain operating regions FP. The first pair of lower gain operating regions FP has lower respective gains GN3 and GN5 than the gain GN4 of the central high gain operating region RE4 (e.g., as indicated by the slopes of the respective signal curve portions 1016 and 1020 as compared to 1018).

More specifically, gain GN3=S3/R3=|(SIG$_{P3B}$−SIG$_{P3A}$)|/(PTP$_{P3B}$−PTP$_{P3A}$)=1.00 volts/1.33 mm=0.75 volts/mm (i.e., in accordance with the example values indicated in the graph 1000 and as indicated by the corresponding slope of the signal curve portion 1016). In addition, in relation to the element position calculations described above, gain GN3=S3/R3=|(SIG$_{P3B}$−SIG$_{P3A}$)|/(EP$_{P3B}$−EP$_{P3A}$)=1.00 volts/0.6 degrees=1.67 volts/degree (i.e., in accordance with the example values indicated in the graph 1000 and as indicated by the corresponding slope of the signal curve portion 1016). In addition, gain GN5=S5/R5=|(SIG$_{P5B}$−SIG$_{P5A}$)|/(PTP$_{P5B}$−PTP$_{P5A}$)=1.00 volts/1.33 mm=0.75 volts/mm (i.e., in accordance with the example values indicated in the graph 1000 and as indicated by the corresponding slope of the signal curve portion 820). In addition, in relation to the element position calculations described above, gain GN5=S5/R5=|(SIG$_{P5B}$−SIG$_{P5A}$)|/(EP$_{P5B}$−EP$_{P5A}$)=1.00 volts/0.6 degrees=1.67 volts/degree (i.e., in accordance with the example values indicated in the graph 1000 and as indicated by the corresponding slope of the signal curve portion 1020).

Thus, in these examples, the gain GN4 of the central high gain operating region is greater than the gains GN3 and GN5 of each of the lower gain operating regions RE3 and RE5 of the first pair of lower gain operating regions FP (i.e., GN4=4.0 volts/mm and 8.88 volts/degree, which is greater than GN3=GN5=0.75 volts/mm and 1.67 volts/degree). These relationships are also noted to be indicated by the slope of the signal curve portion 1018 as compared to the slopes of the signal curve portions 1016 and 1020. The slopes and positions of the signal curve portions 1016 and 1020 are also noted to illustrate a desirable symmetrical and balanced configuration (e.g., with equal position ranges R3 and R5 and equal signal ranges S3 and S5, and equal distances from the center and edges of the graph 1000 and within the operating range OPR.

The signal curve portions 1014 and 1022 correspond to the second pair of lower gain operating regions SP, which correspond to respective lower gain probe tip position ranges R2 and R6. The operating regions RE3 and RE5 of the first pair of lower gain operating regions FP are between the operating regions RE2 and RE6 of the second pair of lower gain operating regions SP. The second pair of lower gain operating regions SP has lower respective gains GN2 and GN6 than the gains GN3 and GN5 of the first pair of lower gain operating regions FP (e.g., as indicated by the slopes of the respective signal curve portions 1014 and 1022 as compared to 1016 and 1020).

More specifically, gain GN2=S2/R2=|(SIG$_{P2B}$−SIG$_{P2A}$)|/(PTP$_{P2B}$−PTP$_{P2A}$)=0.75 volts/1.33 mm=0.5625 volts/mm (i.e., in accordance with the example values indicated in the graph 1000 and as indicated by the corresponding slope of the signal curve portion 1014). In addition, in relation to the element position calculations described above, gain GN2=S2/R2=|(SIG$_{P2B}$−SIG$_{P2A}$)|/(EP$_{P2B}$−EP$_{P2A}$)=0.75 volts/0.6 degrees=1.25 volts/degrees (i.e., in accordance with the example values indicated in the graph 1000 and as indicated by the corresponding slope of the signal curve portion 1014). In addition, gain GN6=S6/R6=|(SIG$_{P6B}$−SIG$_{P6A}$)|/(PTP$_{P6B}$−PTPP6A)=0.75 volts/1.33 mm=0.5625 volts/mm (i.e., in accordance with the example values indicated in the graph 1000 and as indicated by the corresponding slope of the signal curve portion 1022). In addition, in relation to the element position calculations described above, gain GN6=S6/R6=|(SIG$_{P6B}$−SIG$_{P6A}$)|/(EP$_{P6B}$−EP$_{P6A}$)=0.75 volts/0.6 degrees=1.25 volts/degree (i.e., in accordance with the example values indicated in the graph 1000 and as indicated by the corresponding slope of the signal curve portion 1022).

Thus, in these examples, the gains GN3 and GN5 of the first pair of lower gain operating regions FP are greater than the gains GN2 and GN6 of the second pair of lower gain operating regions SP (i.e., GN3=GN5=0.75 volts/mm and 1.67 volts/degree, which is greater than GN2=GN6=0.5625 volts/mm and 1.25 volts/degree). These relationships are also noted to be indicated by the slopes of the signal curve portions 1016 and 1020 as compared to the slopes of the signal curve portions 1014 and 1022. The slopes and positions of the signal curve portions 1014 and 1022 are also noted to illustrate a desirable symmetrical and balanced configuration (e.g., with equal position ranges R2 and R6 and equal signal ranges S2 and S6, and equal distances from the center and edges of the graph 1000 and within the operating range OPR, and for which the signal curve portions 1014 and 1022 are collinear, etc.).

The signal curve portions 1012 and 1024 correspond to the pair of saturation operating regions TP, which correspond to respective saturation probe tip position ranges and which are at the edges of the operating range OPR of the signal processing and control circuitry. The second pair of lower gain operating regions SP is between the pair of saturation operating regions TP, and the pair of saturation operating regions TP corresponds to a saturation state in which nominally no output signal change results from probe tip position change and for which there is nominally no corresponding gain.

Certain ranges of FIG. 10 are noted to be in contrast to certain ranges of FIG. 8, which are configured to be utilized with a stylus of a different length (e.g., a stylus with a length of 20 mm in the example of FIG. 8 as compared to a stylus with a length of 100 mm in the example of FIG. 10). As an example, the scale for the X/Y probe tip position in the graph 800 extends from −2 mm to +2 mm, while the scale for the X/Y probe tip position in the graph 1000 extends from −4 mm to +4 mm. As another example, the operating range OPR (i.e., of the gain signal curve portions 814, 816, 818, 820 and 822) is 3.33 mm in the graph 800, while the operating range OPR (i.e., of the gain signal curve portions 1014, 1016, 1018, 1020 and 1022) is 6.0 mm in the graph 1000.

It is noted that the scale for the UN element position is the same in each of the graphs 800 and 1000, and extends from −1.8 degrees to +1.8 degrees (e.g., for which as illustrated and described above with respect to FIGS. 3-6, the maximum movement ranges of the disruptor element within the position detection configuration may not change with different stylus lengths, etc.). In relation to this aspect, in order to achieve a similar central high gain operating region (e.g., with a similar amount of signal gain for a similar amount of X/Y probe tip position movement), a central high gain element position range may be modified in order to achieve such characteristics. More specifically, in the example of FIG. 8 (e.g., for a 20 mm stylus), the central high gain element position range R4=EP$_{P4B}$−EP$_{P4A}$=0.6 degrees, which corresponds to the central high gain probe tip position range R4=PTP$_{P4B}$−PT$_{P4A}$=0.667 mm and with a gain GN4=S4/R4=|(SIG$_{P4B}$−SIG$_{P4A}$)|/(PT$_{P4B}$−PT$_{P4A}$)=2.66 volts/0.667 mm=4.0 volts/mm. In the example of FIG. 10 (e.g., for a 100 mm stylus), the central high gain element position range has been modified to be ½ that of FIG. 8, in order to achieve the desired characteristics as noted above.

More specifically, in FIG. 10, the central high gain element position range R4=EP$_{P4B}$−EP$_{P4A}$=0.3 degrees, which corresponds to the central high gain probe tip position range R4=PTP$_{P4B}$−PT$_{P4A}$=0.667 mm and with a gain GN4=S4/R4=|(SIG$_{P4B}$−SIG$_{P4A}$)|/(PTP$_{P4B}$−PTP$_{P4A}$)=2.66 volts/0.667 mm=4.0 volts/mm. Thus, the desired probe tip position gain GN4=4.0 volts/mm of FIG. 8 for the 20 mm stylus is maintained in FIG. 10 for the 100 mm stylus by modifying the central high gain element position range R4 to be shorter (i.e., range R4=0.3 degrees in FIG. 10 as compared to range R4=0.6 degrees in FIG. 8). Similarly, if it was desired to move from the configuration of FIG. 10 to the configuration of FIG. 8 (e.g., for changing from a 100 mm stylus to a 20 mm stylus), the central high gain element position range would be modified to be longer (i.e., to range R4=0.6 degrees in FIG. 8 as compared to range R4=0.3 degrees in FIG. 10).

Figure 11:
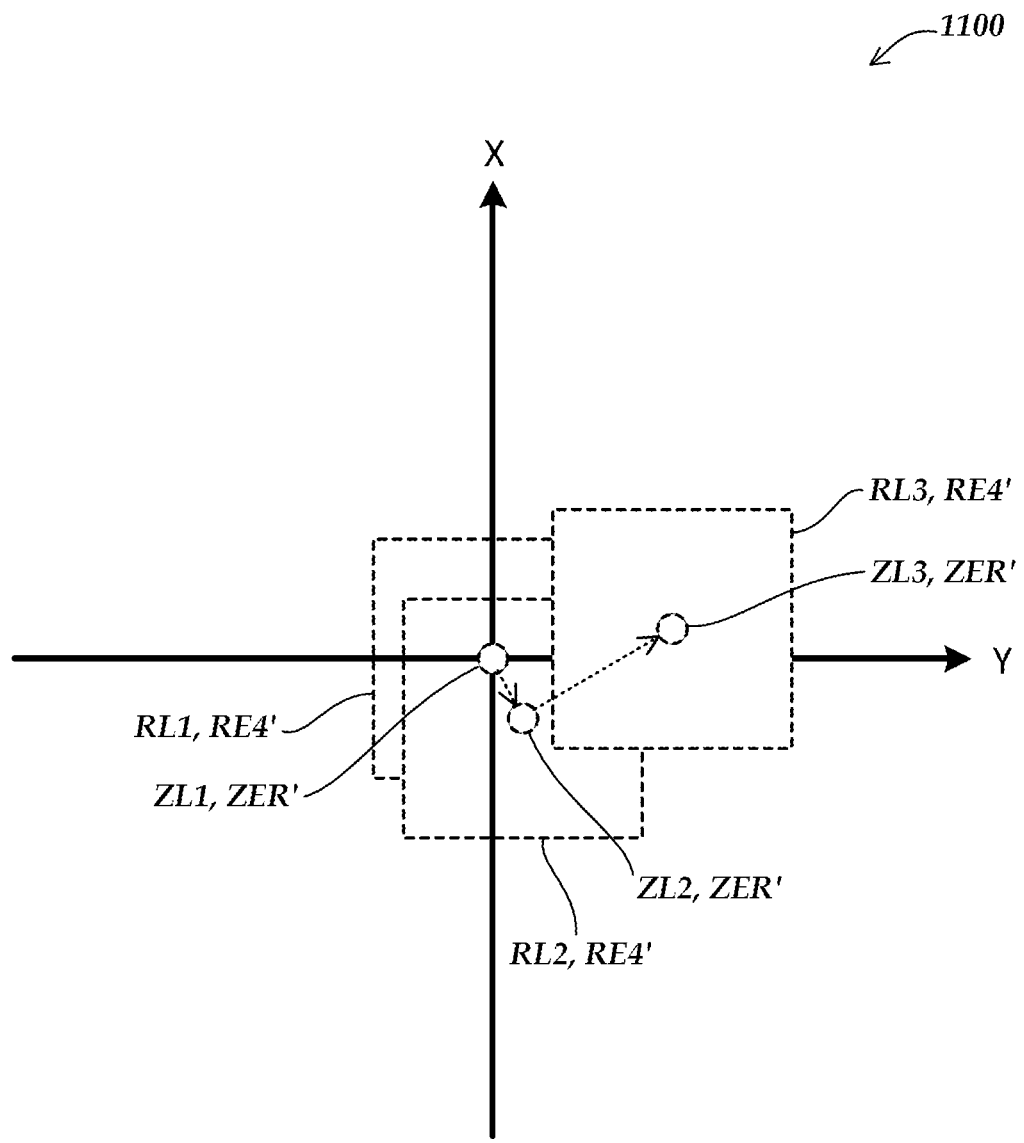
FIG. 11 is a diagram illustrating a process for performing a zeroing operation.

FIG. 11 is a diagram 1100 illustrating a process for performing a zeroing operation to adjust a zero position of a central high gain operating region. In relation to such processes and the probe configurations as described above, it is noted that a nominal position is not necessarily at the zero output of the sensing configuration or the geometrical center of the probe (e.g., as illustrated in FIGS. 3-6). In various implementations, certain issues that result from manufacturing tolerances and electrical offsets can be compensated for by performing a zeroing operation for zeroing the position. In various implementations, a central high gain operating region and other principles as disclosed herein may be applied with reference to a new nominal position that results from such zeroing operations, etc.

In FIG. 11, a central high gain operating region RE4' is illustrated as initially corresponding to a location RL1 on the X,Y axes, and for which a corresponding zero position ZER' of the central high gain operating region RE4' is illustrated as initially corresponding to a location ZL1 (e.g., with coordinates (0,0) on the X,Y axes). The X,Y axes are in relation to an X and Y probe tip position, for which the graphs of FIGS. 8 and 10 in some implementations may be representative of both X and Y probe tip position ranges, for which there may be a separate graph for each axis, and for which the square operating region RE4' may have an X dimension corresponding to an X probe tip position range R4$_X$ and a Y dimension corresponding to a Y probe tip position range R4$_Y$. In such an implementation, the zero position ZER' may be in the middle of both ranges as corresponding to an X,Y probe tip position of 0,0 in relation to the examples of FIGS. 8 and 10. Although not shown in FIG. 11, a combination of first pairs of lower gain operating regions for each of the X and Y probe tip positions could be illustrated by a larger square as surrounding the square of the central high gain operating region RE4' (e.g., and for which gain adjustments could be determined according to when an XY probe tip position moved outside the high gain operating region RE4' to a corresponding lower gain operating region, in particular in an implementation where the gain for the X and Y probe tip positions is not adjustable independently, etc.).

In further regard to the illustration of FIG. 11, as part of a zeroing operation, in order to adjust for a manufacturing tolerance (e.g., as determined during factory calibration), the central high gain operating region RE4' and corresponding zero position ZER' are illustrated as being shifted to locations RL2 and ZL2. Also as part of a subsequent zeroing operation, in order to adjust for a probe orientation (e.g., for which gravity or other factors may affect a stylus position, etc., depending on an orientation of the probe when measurement operations are being performed), the central high gain operating region RE4' and corresponding zero position ZER' are illustrated as being shifted to locations RL3 and ZL3.

Figure 12:
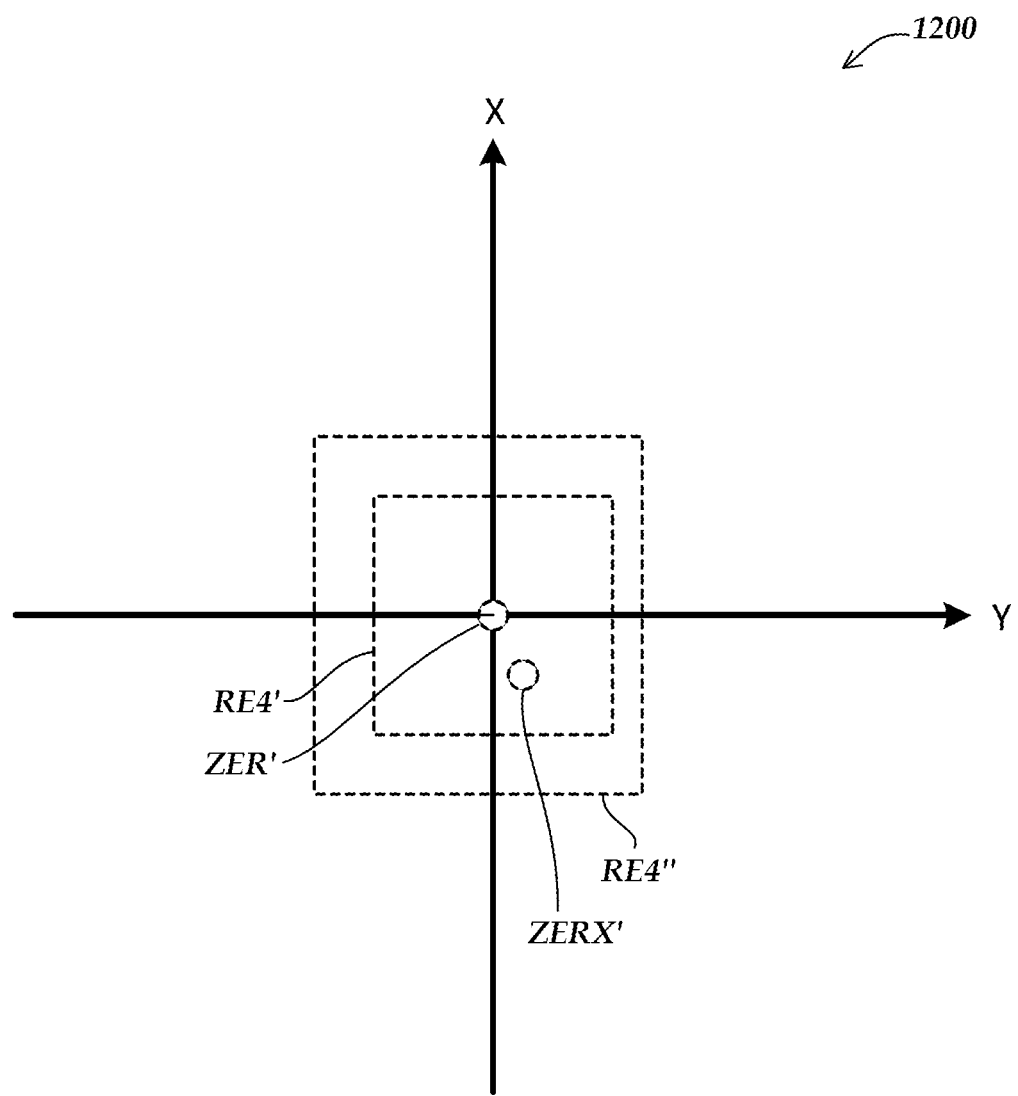
FIG. 12 is a diagram illustrating a process in which a range of a central high gain operating region is increased.

FIG. 12 is a diagram 1100 illustrating a process in which a range of a central high gain operating region is increased to encompass manufacturing tolerances during factory calibration. As shown in FIG. 12, a central high gain operating region RE4' is illustrated with a corresponding zero position ZER' (e.g., with coordinates (0,0) on the XY axes). In order to encompass manufacturing tolerances (e.g., as determined during factory calibration, and such as illustrated by a potential zero position ZERX'), a range of the central high gain operating region is adjusted (i.e., increased), as indicated by the adjusted central high gain operating region RE4". It will be appreciated that in various implementations such processes may also be performed to encompass other variations that may occur, such as due to an orientation of the scanning probe during measurement operations (e.g., for which gravity or other factors may affect a stylus position, etc.).

Figure 13:
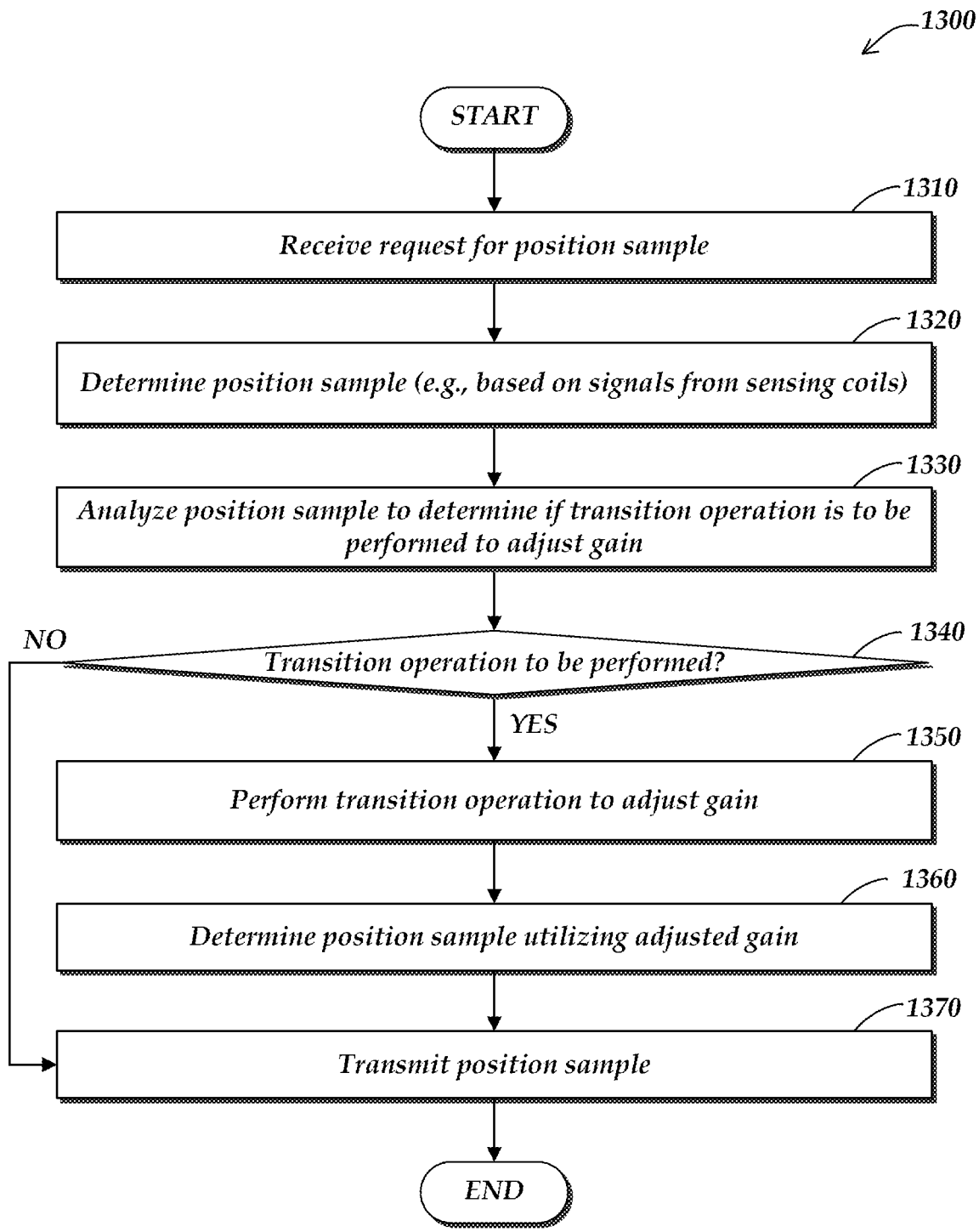
FIG. 13 is a flow diagram illustrating an exemplary implementation of a routine for determining and transmitting a position sample.

FIG. 13 is a flow diagram illustrating an exemplary implementation of a routine 1300 for determining and transmitting a position sample. At a block 1310, a request for a position sample is received (e.g., from a controller). At a block 1320, a position sample is determined (e.g., as based on signals from sensing coils). At a block 1330, the position sample is analyzed to determine if a transition operation is to be performed to adjust the gain. As an example, based on the position, the gain may be adjusted to transition from a central high gain operating region to a lower gain operating region, or vice versa. At a decision block 1340, a determination is made as to whether the analysis indicates that a transition operation is to be performed. If the analysis of the position sample indicates that a transition operation does not need to be performed, the routine proceeds to a block 1370, as will be described in more detail below.

If a transition operation is to be performed, the routine proceeds to a block 1350 where the transition operation is performed to adjust the gain (e.g., as corresponding to a transition from a central high gain operating region to a lower gain operating region, or vice versa, or between other operating regions corresponding to different gain levels, etc.). In various implementations, the gain settings may be included in the position data so that the appropriate compensation can be applied by the controller(s). In various implementations, it may be desirable to utilize some hysteresis to prevent gain oscillation, and it may also be desirable when determining the boundaries of the operating regions to avoid common measurement displacements that may frequently occur. At a block 1360, after the gain has been adjusted, another position sample is determined (e.g., and for which in various implementations the previous position sample that was determined before the gain was adjusted may be transmitted, discarded, etc.). At a block 1370, the position sample that is determined after the gain has been adjusted is transmitted (e.g., to the controller that requested the position sample).

In relation to the blocks 1330-1360, in some implementations it may be desirable for the routine to return to block 1330 from block 1360 in order to analyze a subsequently determined position sample (e.g., in order to verify if more time or further adjustments are needed with respect to a current or additional transition operation, etc.). For example, in a case where saturation is occurring, in some instances a few iterations may be required to fully transition into a non-saturated operating state. In regard to such operations, as well as the operations of block 1360 for which a previous position sample may be discarded, it will be appreciated that the sample rates of such configurations may be relatively high (e.g., relative to a movement rate of the scanning probe and/or higher than a rate required by a controller requesting the position samples), such that in some implementations some of the position samples may be discarded or otherwise not utilized, and for which subsequent position samples that are acquired (e.g., after a gain has been adjusted) may be transmitted and may still be within an acceptable timeframe for the requested position samples.

In various implementations, it may also be desirable for a process such as that illustrated by FIG. 13 to take into account probe tip positions along both the X and Y axes (e.g., such as illustrated in FIGS. 11 and 12). For example, in relation to the X and Y probe tip positions, it will be appreciated that some types of transition operations may not change the gain independently (e.g., in some implementations a transition operation that adjusts power to the field generating coil configuration may affect the gain for both the X and Y probe tip positions). Thus, in some implementations it may be desirable for a process to take into account both the X and Y probe tip positions when a determination is to be made regarding a transition operation for adjusting a gain. For example, as indicated by the implementations of FIGS. 8 and 10, for probe tip positions in ranges further from a center point CEN, the gain may correspondingly be adjusted further down to avoid the possibility of saturation occurring. In accordance with such principles, in an implementation where the gain for the X and Y probe tip positions is not adjusted independently, it may be desirable for the gain adjustment to be determined according to whichever probe tip position (i.e., X or Y probe tip position) is further from the center point.

Figure 14:
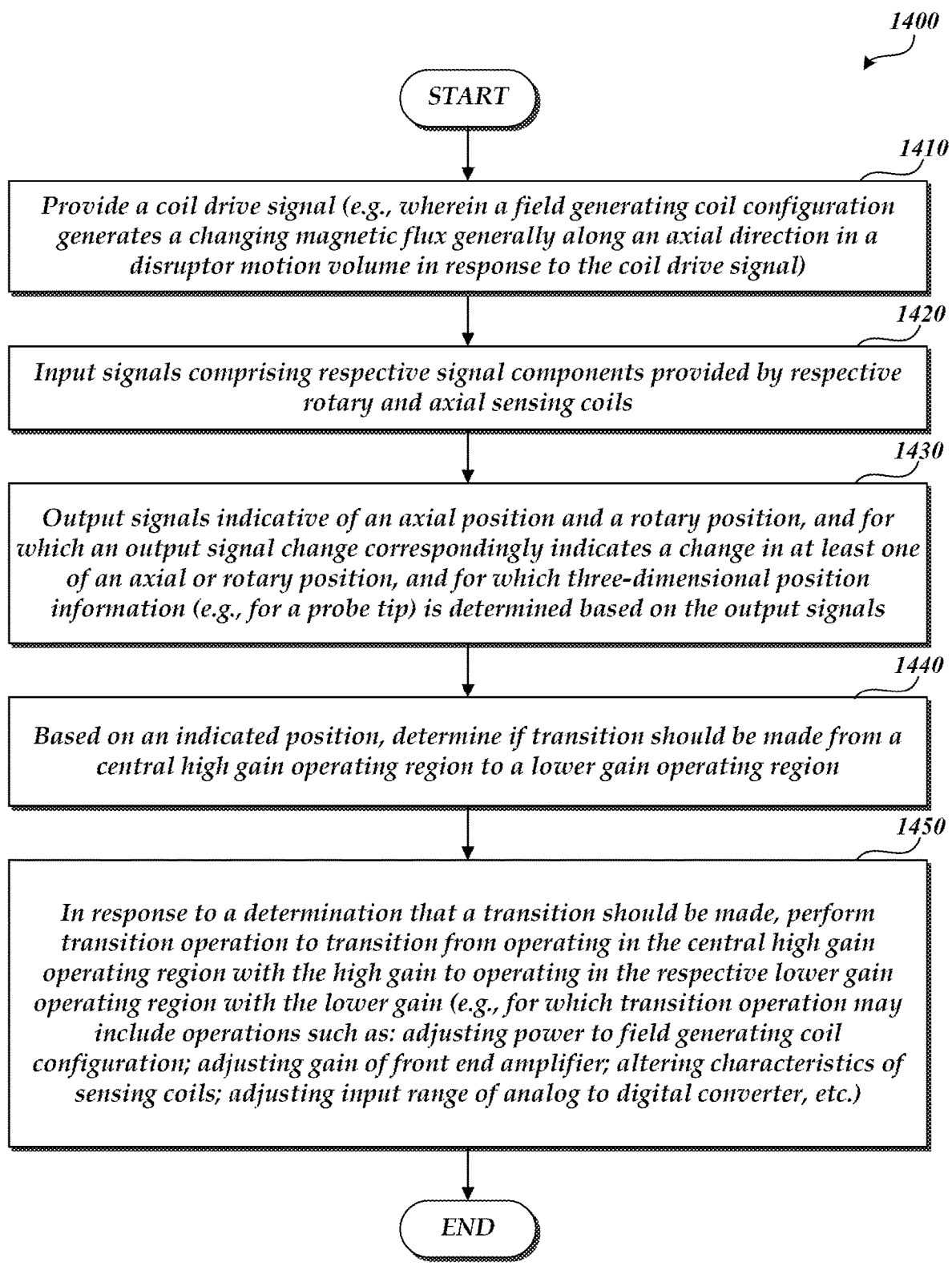
FIG. 14 is a flow diagram illustrating an exemplary implementation of a routine for operating a scanning probe.

FIG. 14 is a flow diagram illustrating an exemplary implementation of a routine 1400 for operating a scanning probe. In various implementations, certain of the operations of the routines 1300 and 1400 may be similar, except with certain of the operations of the routine 1400 directed to a more specific example sequence (e.g., with a transition from a central high gain operating region to a lower gain operating region), as will be described in more detail below. As shown in FIG. 14, at a block 1410, a coil drive signal is provided (e.g., wherein a field generating coil configuration generates a changing magnetic flux generally along an axial direction in a disruptor motion volume in response to the coil drive signal). At a block 1420, signals are input comprising respective signal components provided by respective rotary and axial sensing coils.

At a block 1430, signals are output that are indicative of an axial position and a rotary position, and for which an output signal change correspondingly indicates a change in at least one of an axial or rotary position, and for which three-dimensional position information (e.g., for a probe tip position, such as part of a workpiece measurement, etc.) is determined based on the output signals. At a block 1440, based on an indicated position, it is determined if a transition should be made from a central high gain operating region to a lower gain operating region. At a block 1450, in response to a determination that a transition should be made, a transition operation is performed to transition from operating in the central high gain operating region with the high gain to operating in the respective lower gain operating region with the lower gain. In various implementations, the transition operation may include operations for adjusting the gain such as: adjusting power to a field generating coil configuration; adjusting a gain of a front end amplifier; altering characteristics of sensing coils; adjusting an input range of an analog to digital converter, etc.

As indicated above with respect to blocks 1410-1430 (e.g., and in accordance with the operations of blocks 1320 and 1360 of FIG. 13, etc.), signals are input from the rotary and axial sensing coils, on the basis of which signals are output that are indicative of an axial and rotary position (e.g., of the probe tip), and for which three-dimensional position information may be determined based on the output. As a specific example in relation to the components of FIG. 6 (as described above), the digital controller/processor 681 may process and/or combine digital signal values (e.g., corresponding to signals from the sensing coils) according to various desired relationships (for example, as prescribed in the relationships shown in EQUATIONS 5-7, or the like), to determine and output the output signals APSOut and RPSOut, which are indicative of the axial position and the rotary position (e.g., of the stylus 506 and/or its probe tip 548). In some implementations, the digital controller/processor 681 may be configured such that the output signals APSOut and RPSOut directly indicate the three-dimensional position of the stylus 506 and/or its probe tip 548 relative to the frame of the scanning probe. In other implementations, the digital controller/processor 681 may be configured to output signals that indirectly indicate the three-dimensional position of the stylus 506 and/or its probe tip 548 relative to the frame of the scanning probe, and a host system (e.g., a CMM, a host computer 120, etc.) may input such signals and perform additional processing to further combine or refine such signals and determine the three-dimensional position of the stylus 506 and/or its probe tip 548 relative to the scanning probe and/or relative to an overall coordinate system used for CMM measurements.

In any case, the determination of signals (e.g., signals APSOut and RPSOut) and/or subsequent calculations to determine the three-dimensional position of the stylus 506 or its probe tip 548 may include the gain as a factor (e.g., a gain that is utilized to produce a respective output signal is included as a factor in calculations for determining a corresponding position, etc.). As a simplified numerical example, in relation to FIG. 8, for the illustrated central high gain operating region RE4 (i.e., with the corresponding signal curve portion 818 passing through the center point CEN), with the gain GN4=4.0 volts/mm, a probe tip position for a measurement point $PTP_{MP}$ (e.g., on a workpiece surface) may be determined according to $PTP_{MP}=SIG_{MP}/GN4=SIG_{MP}/4.0$ volts/mm. Thus, if the signal corresponding to the measurement point (i.e., signal $SIG_{MP}$)=1.0 volts, then $PTP_{MP}$=1.0 volts/4.0 volts/mm=0.25 mm. Similarly, for the illustrated lower gain operating region RE5 (i.e., with the corresponding signal curve portion 820 being collinear with the signal curve portion 816 and with a line passing through the center point CEN), with the gain GN5=1.5 volts/mm, a probe tip position for a measurement point $PTP_{MP}$ may be determined according to $PTP_{MP}=SIG_{MP}/GN5=SIG_{MP}/1.5$ volts/mm. Thus, if the signal corresponding to the measurement point (i.e., signal $SIG_{MP}$)=1.0 volts, then $PTP_{MP}$=1.0 volts/1.5 volts/mm=0.67 mm. Similar calculations may be performed in relation to signal curve portions that are not collinear with a line that passes through the center point CEN, and for which an offset value may be included in the calculation in accordance with known methods, or in some implementations the gains and operating regions may be configured such that all of the signal curve portions are collinear with lines that pass through the center point CEN, for which calculations such as those described above may be utilized.

In some implementations, a stylus length (e.g., which may be a factor in the position calculations for a probe tip, such as indicated by the EQUATIONS 2 and 3) may be manually indicated/entered by a user, or may be automatically detected (e.g., in accordance with a sensor configuration for sensing a stylus length, such as an RFID tag, optical indicator, etc., on a stylus that is detected/read by a corresponding sensor/scanner of the system, etc.). As noted above, the gain (e.g., as adjusted by transition operations in accordance with operating regions, and for which the length of the stylus may determine the ranges and/or characteristics of the operating regions that are utilized, as illustrated for example by the differences between FIGS. 8 and 10) may be a factor in the position calculations/determinations.

As noted above, in some implementations a gain may be independently adjusted for each of the X and Y probe tip positions (e.g., as may correspond to signals RPSOut), in which case the respective gains may be adjusted in operations and utilized as factors as part of the respective calculations for the respective X and Y probe tip positions (e.g., for which the gains may be adjusted by transition operations in accordance with operating regions such as those of FIG. 8 or 10, for each of the respective X and Y probe tip positions, etc.).

Alternatively, in some implementations a gain is not independently adjusted for the X and Y probe tip positions (e.g., as may correspond to signals RPSOut), in which case a single gain may be adjusted in operations and utilized as a factor as part of the calculations for both the X and Y probe tip positions (e.g., for which, in some implementations, the single gain may be adjusted by transition operations according to whichever of the X or Y probe tip positions is further from a center point and in accordance with operating regions such as those illustrated in FIG. 8 or 10, etc.).

As a specific example in relation to FIG. 8 in an implementation where a single gain is utilized, if an X probe tip position $PTP_{MPX}$ is within a range R4$_X$ of an operating region RE4$_X$ (e.g., of a respective X probe tip position graph), but a Y probe tip position $PTP_{MPY}$ is within a range R5$_Y$ of an operating region RE5$_Y$ (e.g., of a respective Y probe tip position graph), then since the Y probe tip position $PTP_{MPY}$ is further from the center point CEN, in some implementations the single gain GN5=1.5 volts/mm may be utilized for both the X and Y probe tip positions, and for which each of the X and Y probe tip positions for a measurement point $PTP_{MP}$ may be determined according to $PTP_{MP}=SIG_{MP}/GN5=SIG_{MP}/1.5$ volts/mm. For example, if for the Y probe tip position the output signal corresponding to the measurement point (i.e., signal $SIG_{MPY}$)=1.0 volts, then $PTP_{MPY}$=1.0 volts/1.5 volts/mm=0.67 mm. Similarly, if for the X probe tip position the output signal corresponding to the measurement point (i.e., signal $SIG_{MPX}$)=0.375 volts, then $PTP_{MPX}$=0.375 volts/1.5 volts/mm=0.25 mm. In relation to the example of FIG. 11, the probe tip position $PTP_{MP}$ may be designated as being at corresponding (X, Y) measurement coordinates of (0.25 mm, 0.67 mm). In relation to the example of the square central high gain operating region RE4' of FIG. 11 at the location ZL1 as described above, which may have an X dimension corresponding to an X probe tip position range $R4_X$ and a Y dimension corresponding to a Y probe tip position range $R4_Y$ (e.g., each as extending from −0.33 mm to +0.33 mm in accordance with the example values of FIG. 8), for the probe tip position $PTP_{MP}$ the corresponding measurement coordinates (+0.25 mm, +0.67 mm) would be outside of the square operating region RE4' (i.e., due to the $PTP_{MPY}$=+0.67 mm, and for which the single corresponding gain to be utilized would be the gain GN5=1.5 volts/mm of the first lower gain operating region RE5 rather than the gain GN4=4.0 volts/mm that would have been utilized had the measurement coordinates been within the square operating region RE4'). As noted above, in an alternative implementation where the gains for each of the X and Y probe tip positions may be adjusted independently, then in such a scenario the gain GN5=1.5 volts/mm may be utilized for the Y probe tip position (i.e., with the values as indicated above) and the gain GN4=4.0 volts/mm may be utilized for the X probe tip position (i.e., for which $PTP_{MPX}$=0.25 mm, and for which the corresponding signal would be $SIG_{MPX}=(PTP_{MPX})(GN4_X)$=(0.25 mm) (4.0 volts/mm)=1.0 volts). It is noted that this higher signal $SIG_{MPX}$=1.0 volts as produced by the gain GN4=4.0 volts/ mm may generally be preferable over the lower signal $SIG_{MPX}$=0.375 volts as produced by the gain GN5=1.5 volts/mm (e.g., due to a higher corresponding signal to noise ratio for the signal, etc.), and for which the above numerical examples thus illustrate certain desirable characteristics of the techniques as disclosed herein.

More specifically, in accordance with principles disclosed herein, ranges for central high gain operating regions and lower gain operating regions may be determined in accordance with typical probe tip deflections during measurement operations. For example, in some implementations typical probe tip deflections may be less than a few hundred microns (e.g., due to scanning of workpieces with relatively small defects and for which the dimensions are generally known and for which scanning movements are well controlled to follow along the surfaces and/or other features of the workpieces). In such implementations, a range for a central high gain operating region may be determined (e.g., extending from −0.33 mm to +0.33 mm, or extending from −0.5 mm to +0.5 mm, etc.) so as to include a majority of such typical probe tip deflections, and for which a relatively high gain (e.g., 4.0 volts/mm) may be utilized (e.g., as resulting in higher output signal levels for the typical probe tip deflections/measurements, with correspondingly better signal to noise ratios, etc.). In addition, the one or more pairs of lower gain operating regions of such configurations enable a larger total range to be implemented (e.g., extending from −1.67 mm to +1.67 mm, or extending from −2.0 mm to +2.0 mm and/or as corresponding to a full mechanical range, etc.), which may be utilized for probe tip deflections outside of a typical range (e.g., due to possible over-travel of the scanning probe during measurement operations, measurements of large defects, as part of collision detection as indicated by a probe tip being deflected to an edge of a mechanical range, etc.).

It will be appreciated that the principles described above with respect to FIGS. 7-14 may be utilized with various configurations and types of stylus position detection portions and associated electronics, such as the stylus position detection portions 411, 511, 511' described above with respect to FIGS. 3-6. In addition, such principles may also be utilized with other configurations of stylus position detection portions. As some specific examples, such principles may be utilized with the configurations disclosed in the previously incorporated U.S. Patent Publication No. 2020/0141717, as well as with the configurations disclosed in co-pending and commonly assigned U.S. patent application Ser. No. 17/135,665, entitled "Inductive Position Detection Configuration for Indicating a Measurement Device Stylus Position", as filed on Dec. 28, 2020, and in co-pending and commonly assigned U.S. patent application Ser. No. 17/135,672, entitled "Inductive Position Detection Configuration for Indicating a Measurement Device Stylus Position and Including Coil Misalignment Compensation", as filed on Dec. 28, 2020, each of which is hereby incorporated herein by reference in its entirety. It will be appreciated that these incorporated references illustrate certain configurations with variations in the locations, sizes and/or shapes of the sensing coils, field generating coils, disruptor element(s), etc., (e.g., with a single printed circuit board including all of the coils of the coil board configuration, and/or with a cylindrical disruptor element configured to move and fit within the hole of the coil board configuration, etc.), but for which the coils and/or associated operations are otherwise similar to those of the stylus position detection portions 411, 511, 511' described above with respect to FIGS. 3-6, and for which the configurations may similarly be utilized/implemented with the operations, regions, ranges, calculations, etc., as disclosed herein.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A scanning probe for a coordinate measuring machine, the scanning probe comprising:
 a stylus suspension portion that is coupled to a frame of the scanning probe, comprising:

a stylus coupling portion that is configured to be rigidly coupled to a stylus with a probe tip; and a stylus motion mechanism that is configured to enable axial motion of the stylus coupling portion along an axial direction, and rotary motion of the stylus coupling portion about a rotation center;

a stylus position detection portion arranged along a central axis that is parallel to the axial direction and nominally aligned with the rotation center, comprising:

a field generating coil configuration comprising at least one field generating coil;

a top axial sensing coil configuration comprising at least one top axial sensing coil;

a bottom axial sensing coil configuration comprising at least one bottom axial sensing coil; and N top rotary sensing coils and N bottom rotary sensing coils, where N is an integer greater than 3;

a disruptor configuration comprising a conductive disruptor element that provides a disruptor area, wherein the disruptor element is located along the central axis in a disruptor motion volume and the disruptor element is coupled to the stylus suspension portion by a coupling configuration, wherein the disruptor element moves in the disruptor motion volume relative to an undeflected position in response to a deflection of the stylus suspension portion, the disruptor element moving over operating motion ranges +/−Rz−along the axial direction in response to the axial motion, and over respective operating motion ranges +/−Rx and +/−Ry along orthogonal X and Y directions that are orthogonal to the axial direction in response to the rotary motion, the field generating coil configuration generating a changing magnetic flux generally along the axial direction in the disruptor motion volume in response to a coil drive signal; and signal processing and control circuitry that is operably connected to the coils of the stylus position detection portion to provide the coil drive signal and configured to input signals comprising respective signal components provided by the respective rotary and axial sensing coils, and output signals indicative of an axial position and a rotary position of the probe tip, and for which an output signal change correspondingly indicates a change in at least one of an axial or rotary position of the probe tip, wherein the signal processing and control circuitry is configured to operate over a plurality of operating regions, the plurality of operating regions comprising:

a central high gain operating region which corresponds to a central high gain probe tip position range; and a first pair of lower gain operating regions which corresponds to respective lower gain probe tip position ranges, wherein the central high gain operating region is between the operating regions of the first pair of lower gain operating regions, and wherein the gain of each operating region corresponds to a ratio of a magnitude of output signal change to probe tip position change for the respective operating region, for which the first pair of lower gain operating regions has lower respective gains than the gain of the central high gain operating region; and wherein the signal processing and control circuitry is configured to perform a transition operation in response to a determination that the probe tip has moved from a position in the central high gain probe tip position range of the central high gain operating region to a position in a lower gain probe tip position range of a respective operating region of the first pair of lower gain operating regions, the transition operation resulting in the signal processing and control circuitry transitioning from operating in the central high gain operating region with the high gain to operating in the respective operating region with the lower gain.

2. The scanning probe of claim 1, wherein:

the plurality of operating regions further comprise a second pair of lower gain operating regions which corresponds to respective lower gain probe tip position ranges, wherein the operating regions of the first pair of lower gain operating regions are between the operating regions of the second pair of lower gain operating regions, and the second pair of lower gain operating regions have lower respective gains than the gains of the first pair of lower gain operating regions; and the signal processing and control circuitry is further configured to perform a transition operation in response to a determination that the probe tip has moved to a position in a lower gain probe tip position range of a respective operating region of the second pair of lower gain operating regions, the transition operation resulting in the signal processing and control circuitry transitioning to operating in the respective operating region of the second pair of lower gain operating regions with the lower gain.

3. The scanning probe of claim 2, wherein the plurality of operating regions further comprise a pair of saturation operating regions which corresponds to respective saturation probe tip position ranges, wherein the second pair of lower gain operating regions is between the pair of saturation operating regions, and the pair of saturation operating regions corresponds to a saturation state in which nominally no output signal change results from probe tip position change and for which there is nominally no corresponding gain.

4. The scanning probe of claim 3, wherein the signal processing and control circuitry comprises one or more amplifiers configured to amplify signals from coils of the stylus position detection portion, and the saturation state corresponds to a saturation of at least one of the one or more amplifiers.

5. The scanning probe of claim 1, wherein:

the central high gain operating region which corresponds to the central high gain probe tip position range also corresponds to a central high gain element position range, which corresponds to an angular position range of the disruptor element, and is configured to be utilized in combination with a stylus of a first stylus length; and for a stylus of a second stylus length, the central high gain element position range is configured to be modified to be at least one of:

shorter, as configured to be utilized with a second stylus length that is longer than the first stylus length; or longer, as configured to be utilized with a second stylus length that is shorter than the first stylus length.

6. The scanning probe of claim 1, wherein the signal processing and control circuitry is further configured to perform a zeroing operation to adjust a zero position of the central high gain operating region.

7. The scanning probe of claim 1, wherein the signal processing and control circuitry is further configured to have at least a position range of the central high gain operating region increased to at least one of:

encompass manufacturing tolerances during factory calibration; or encompass variations that may occur due to an orientation of the scanning probe during measurement operations.

8. The scanning probe of claim 1, wherein the transition operation comprises reducing a power of the field generating coil configuration so as to reduce the ratio of the magnitude of output signal change to probe tip position change so as to correspond to the lower gain.

9. The scanning probe of claim 8, wherein reducing the power of the field generating coil comprises reducing the coil drive signal.

10. The scanning probe of claim 1, wherein the signal processing and control circuitry comprises one or more variable gain amplifiers configured to amplify signals from coils of the stylus position detection portion, and the transition operation comprises reducing a gain of the one or more variable gain amplifiers so as to reduce the ratio of the magnitude of output signal change to probe tip position change so as to correspond to the lower gain.

11. The scanning probe of claim 1, wherein the transition operation comprises altering a characteristic of one or more of the rotary sensing coils so as to reduce the ratio of the magnitude of output signal change to probe tip position change so as to correspond to the lower gain.

12. The scanning probe of claim 11, wherein the altering of the characteristic of the one or more rotary sensing coils comprises utilizing at least one of a relay or switch to effectively decrease the operating size of the one or more rotary sensing coils.

13. The scanning probe of claim 1, wherein the signal processing and control circuitry comprises one or more analog to digital converters configured to convert analog signals from coils of the stylus position detection portion to digital signals, and the transition operation comprises altering an input range of the one or more analog to digital converters so as to reduce the ratio of the magnitude of output signal change to probe tip position change so as to correspond to the lower gain.

14. The scanning probe of claim 1, wherein the determination that the probe tip has moved from a position in the central high gain probe tip position range to a position in the respective lower gain probe tip position range is made in accordance with an analysis of a position sample which comprises signals from coils of the stylus position detection.

15. The scanning probe of claim 14, wherein after the determination is made that the probe tip has moved into the respective lower gain probe tip position range as based on the analysis of the corresponding position sample, and after the transition operation has correspondingly been performed to lower the gain, a new position sample is obtained and is utilized to indicate the probe tip position instead of the position sample that was obtained before the transition operation was performed to lower the gain.

16. A method, comprising:
determining three-dimensional position information based on inductive sensing signals generated by a scanning probe as the scanning probe is moved along a surface of a workpiece, wherein the scanning probe comprises:
a stylus suspension portion that is coupled to a frame of the scanning probe, comprising:
a stylus coupling portion that is configured to be rigidly coupled to a stylus with a probe tip;
a stylus motion mechanism that is configured to enable axial motion of the stylus coupling portion along an axial direction, and rotary motion of the stylus coupling portion about a rotation center; and a stylus position detection portion arranged along a central axis that is parallel to the axial direction and nominally aligned with the rotation center, comprising:
a field generating coil configuration comprising at least one field generating coil;
a top axial sensing coil configuration comprising at least one top axial sensing coil;
a bottom axial sensing coil configuration comprising at least one bottom axial sensing coil; and
N top rotary sensing coils and N bottom rotary sensing coils, where N is an integer greater than 3;
a disruptor configuration comprising a conductive disruptor element that provides a disruptor area, wherein the disruptor element is located along the central axis in a disruptor motion volume and the disruptor element is coupled to the stylus suspension portion by a coupling configuration, wherein the disruptor element moves in the disruptor motion volume relative to an undeflected position in response to a deflection of the stylus suspension portion, the disruptor element moving over operating motion ranges +/−Rz−along the axial direction in response to the axial motion, and over respective operating motion ranges +/−Rx and +/−Ry along orthogonal X and Y directions that are orthogonal to the axial direction in response to the rotary motion, the field generating coil configuration generating a changing magnetic flux generally along the axial direction in the disruptor motion volume in response to a coil drive signal; and
wherein the determining of the three-dimensional position information based on inductive sensing signals generated by the scanning probe comprises:
providing the coil drive signal;
inputting signals comprising respective signal components provided by the respective rotary and axial sensing coils;
outputting signals indicative of an axial position and a rotary position of the probe tip, and for which an output signal change correspondingly indicates a change in at least one of an axial or rotary position of the probe tip, and for which the three-dimensional position information is determined based on the output signals;
based on an indicated position of the probe tip, determining if a transition should be made from a central high gain operating region to a lower gain operating region, wherein:
the central high gain operating region corresponds to a central high gain probe tip position range; and
the lower gain operating region is one of a first pair of lower gain operating regions which corresponds to respective lower gain probe tip position ranges, wherein the central high gain operating region is between the first pair of lower gain operating regions, and wherein the gain of each operating region corresponds to a ratio of a magnitude of output signal change to probe tip position change for the respective operating region, for which the first pair of lower gain operating regions has lower respective gains than the central high gain operating region, and for which a transition from the high gain operating region to a respective lower gain operating region should be made if it is determined that the probe tip has moved from a position in the central high gain probe tip position range to a position in a respective lower gain probe tip position range; and performing a transition operation in response to a determination that a transition should be made from the central high gain operating region to a lower gain operating region, the transition operation resulting in transitioning from operating in the central high gain operating region with the high gain to operating in the respective lower gain operating region with the lower gain.

17. The method of claim 16, wherein the transition operation comprises reducing a power of the field generating coil configuration so as to reduce the ratio of the magnitude of output signal change to probe tip position change so as to correspond to the lower gain.

18. The method of claim 17, wherein reducing the power of the field generating coil comprises reducing the coil drive signal.

19. The method of claim 16, wherein the signal processing and control circuitry comprises one or more variable gain amplifiers configured to amplify signals from coils of the stylus position detection portion, and the transition operation comprises reducing a gain of the one or more variable gain amplifiers so as to reduce the ratio of the magnitude of output signal change to probe tip position change so as to correspond to the lower gain.

20. The method of claim 16, wherein the transition operation comprises altering a characteristic of one or more of the rotary sensing coils so as to reduce the ratio of the magnitude of output signal change to probe tip position change so as to correspond to the lower gain.

21. The method of claim 16, wherein the signal processing and control circuitry comprises one or more analog to digital converters configured to convert analog signals from coils of the stylus position detection portion to digital signals, and the transition operation comprises altering an input range of the one or more analog to digital converters so as to reduce the ratio of the magnitude of output signal change to probe tip position change so as to correspond to the lower gain.

22. The method of claim 16, wherein the central high gain operating region which corresponds to the central high gain probe tip position range also corresponds to a central high gain element position range, which corresponds to an angular position range of the disruptor element, and is configured to be utilized in combination with a stylus of a first stylus length, and the method further comprises modifying the central high gain element position range based on a determination that a stylus of a second length that is different than the first length has been coupled to the stylus coupling portion.

23. A system, comprising:
a scanning probe;
a drive mechanism; and
an attachment portion attaching the scanning probe to the drive mechanism, wherein the scanning probe comprises:
a stylus suspension portion that is coupled to a frame of the scanning probe, comprising:
a stylus coupling portion that is configured to be rigidly coupled to a stylus with a probe tip; and
a stylus motion mechanism that is configured to enable axial motion of the stylus coupling portion along an axial direction, and rotary motion of the stylus coupling portion about a rotation center; and a stylus position detection portion arranged along a central axis that is parallel to the axial direction and nominally aligned with the rotation center, comprising:
a field generating coil configuration comprising at least one field generating coil;
a top axial sensing coil configuration comprising at least one top axial sensing coil;
a bottom axial sensing coil configuration comprising at least one bottom axial sensing coil; and
N top rotary sensing coils and N bottom rotary sensing coils, where N is an integer greater than 3;
a disruptor configuration comprising a conductive disruptor element that provides a disruptor area, wherein the disruptor element is located along the central axis in a disruptor motion volume and the disruptor element is coupled to the stylus suspension portion by a coupling configuration, wherein the disruptor element moves in the disruptor motion volume relative to an undeflected position in response to a deflection of the stylus suspension portion, the disruptor element moving over operating motion ranges +/−Rz−along the axial direction in response to the axial motion, and over respective operating motion ranges +/−Rx and +/−Ry along orthogonal X and Y directions that are orthogonal to the axial direction in response to the rotary motion, the field generating coil configuration generating a changing magnetic flux generally along the axial direction in the disruptor motion volume in response to a coil drive signal; and signal processing and control circuitry that is operably connected to the coils of the stylus position detection portion to provide the coil drive signal and configured to input signals comprising respective signal components provided by the respective rotary and axial sensing coils, and output signals indicative of an axial position and a rotary position of the probe tip, and for which an output signal change correspondingly indicates a change in at least one of an axial or rotary position of the probe tip, wherein the signal processing and control circuitry is configured to operate over a plurality of operating regions, the plurality of operating regions comprising:
a central high gain operating region which corresponds to a central high gain probe tip position range; and
a first pair of lower gain operating regions which corresponds to respective lower gain probe tip position ranges, wherein the central high gain operating region is between the first pair of lower gain operating regions, and wherein the gain of each operating region corresponds to a ratio of a magnitude of output signal change to probe tip position change for the respective operating region, for which the first pair of lower gain operating regions has lower respective gains than the central high gain operating region; and
wherein the signal processing and control circuitry is configured to perform a transition operation in response to a determination that the probe tip has moved from a position in the central high gain probe tip position range of the central high gain operating region to a position in a lower gain probe tip position range of a respective lower gain operating region of the first pair of lower gain operating regions, the transition operation resulting in the signal processing and control circuitry transitioning from operating in the central high gain operating region with the high gain to operating in the respective lower gain operating region with the lower gain.

* * * * *